(12) United States Patent
Yoshida et al.

(10) Patent No.: US 7,767,265 B2
(45) Date of Patent: Aug. 3, 2010

(54) MICROSTRUCTURE, PATTERN MEDIUM AND PROCESS FOR PRODUCING SAME

(75) Inventors: Hiroshi Yoshida, Mito (JP); Hideki Nagano, Tsukuba (JP); Hirokazu Hasegawa, Kyoto (JP); Mikihito Takenaka, Kyoto (JP); Feng Chen, Kyoto (JP)

(73) Assignee: Hitachi, Ltd., Tokyo (JP)

( * ) Notice: Subject to any disclaimer, the term of this patent is extended or adjusted under 35 U.S.C. 154(b) by 471 days.

(21) Appl. No.: 11/751,661

(22) Filed: May 22, 2007

(65) Prior Publication Data

US 2008/0290067 A1    Nov. 27, 2008

(30) Foreign Application Priority Data

May 23, 2006  (JP) ............................. 2006-142247

(51) Int. Cl.
 *B05D 3/02* (2006.01)
(52) U.S. Cl. .................. 427/374.1; 216/41; 427/248.1
(58) Field of Classification Search .............. 427/374.1, 427/372.2; 216/41
See application file for complete search history.

(56) References Cited

U.S. PATENT DOCUMENTS

| | | | |
|---|---|---|---|
| 6,746,825 B2 | 6/2004 | Nealey et al. | |
| 6,926,953 B2 | 8/2005 | Nealey et al. | |
| 2002/0055239 A1 | 5/2002 | Tuominen et al. | |
| 2004/0143063 A1 | 7/2004 | Chen et al. | |
| 2005/0055239 A1* | 5/2005 | Tuominen et al. | ............. 438/66 |

OTHER PUBLICATIONS

Sang Ouk Kim, et al.; Epitaxial self-assembly of block copolymers on lithographically defined nanopatterned substrates; Letters to Nature; Jul. 24, 2003; pp. 411-414; vol. 424.
Richard A. Register; On the straight and narrow; Nature; Jul. 24, 2003; pp. 378-379; vol. 424.
Mark P. Stoykovich, et al.; Directed Assembly of Block Copolymer Blends into Nonregular Device-Oriented Structures; Science; www.. sciencemag.org; Jun. 3, 2005; pp. 1442-1446; vol. 308.
Xiao M. Yang, et al.; Guided Self-Assembly of Symmetric Diblock Copolymer Films on Chemically Nanopatterned Substrates; Macromolecules 2000; pp. 9575-9582; vol. 33; No. 26.

(Continued)

*Primary Examiner*—Roberts Culbert
(74) *Attorney, Agent, or Firm*—Antonelli, Terry, Stout & Kraus, LLP.

(57) ABSTRACT

It is an object to provide a microstructure having cylindrical microdomains oriented in the film thickness direction and arranged in a regular pattern, for which a microphase separation phenomenon of a block copolymer is utilized. The process for producing the microstructure includes 2 steps; the first step for arranging, on a substrate (40), a polymer layer at least containing a block copolymer having a first block which constitutes a continuous phase (10) of the microstructure (30) and a second block which constitutes microdomains (20) dispersed in the continuous phase (10) and oriented in the thickness direction; and second step for thermally treating the substrate (40) at a neutral temperature (Tn), at which a first material (A) and second material (B) which constitute the respective first and second blocks have substantially the same interfacial tension with the substrate (40) surface (X).

9 Claims, 13 Drawing Sheets

OTHER PUBLICATIONS

Richard D. Peters, et al.; Using Self-Assembled Monolayers Exposed to X-rays To Control the Wetting Behavior of Thin Films of Diblock Copolymers; Langmuir 2000, pp. 4625-4631; vol. 16; No. 10.

Xiaomin Yang, et al.; Nanoscopic templates using self-assembled cylindrical diblock copolymers for patterned media; J. Vac. Sci. technol. B; Nov./Dec. 2004; pp. 3331-3334; vol. 22, No. 6.

Chang Ok Kim, et al.; Self-Assembly of a Diblock Copolymer on a Patterned Surface with Low-Energy Electron Beam; Langmuir 2006; pp. 4131-4135; vol. 22; No. 9.

Du Yeol Ryu, et al.; A Generalized Approach to the Modification of Solid Surfaces; Science www.sciencemag.org; Apr. 8, 2005; pp. 236-239; vol. 308.

Craig J. Hawkera, et al.; Block Copolymer Lithography: Merging "Bottom-Up" with "Top-Down" Processes; MRS Bulletin; Dec. 2005; pp. 952-966; vol. 30.

Chinese Official Action issued Jan. 22, 2010, for Application No. 2007101042694.

\* cited by examiner

FIG.3(a)
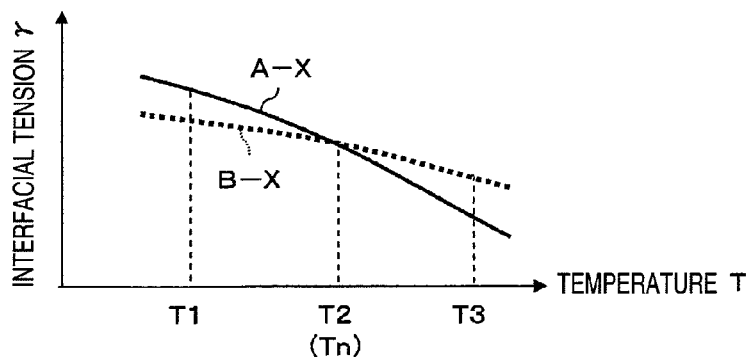
FIG.3(b) T=T1 (Tg<T1)
INTERFACIAL TENSION: $\gamma(AX1) > \gamma(BX1)$
CONTACT ANGLE: $\theta(AX1) > \theta(BX1)$
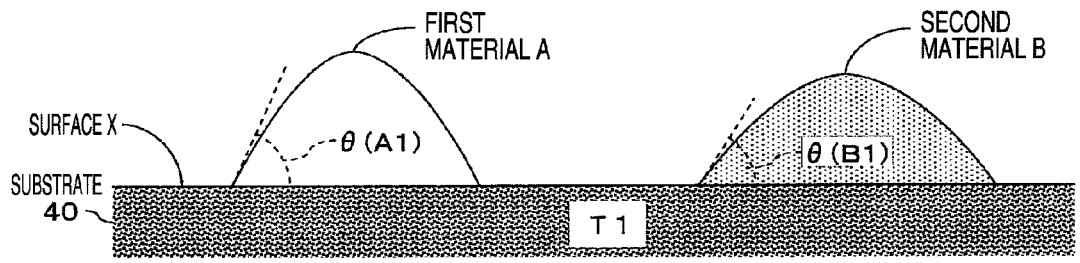
FIG.3(c) T=T2(Tn) (T1<T2)
$\gamma(AX2) = \gamma(BX2)$
$\theta(AX2) = \theta(BX2)$
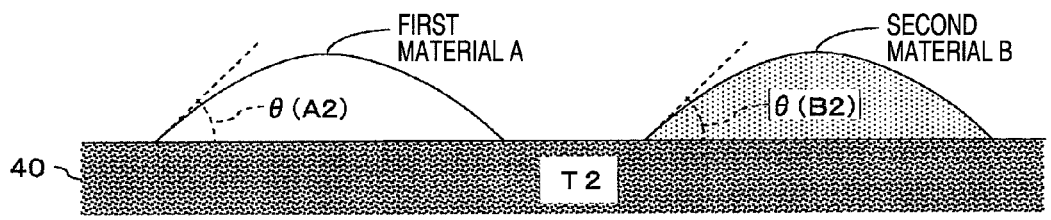
FIG.3(d) T=T3 (T2<T3)
$\gamma(AX3) < \gamma(BX3)$
$\theta(AX3) < \theta(BX3)$
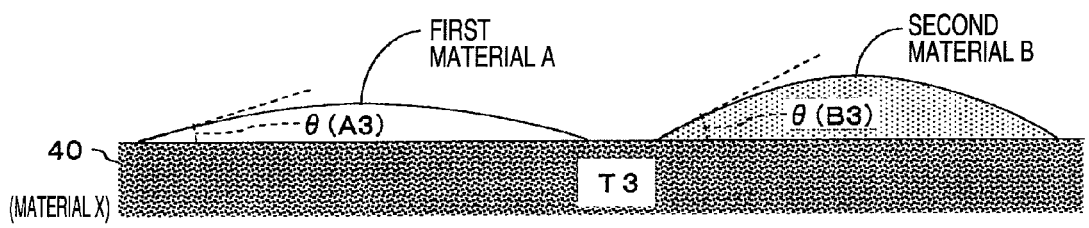

FIG.12(a)

| SURFACE | 150°C | 170°C | 190°C | 200°C | 230°C |
|---|---|---|---|---|---|
| SiO$_2$ | PMMA | PMMA | PMMA | PMMA | NEUTRAL |
| Ta | PMMA | PMMA | PMMA | PMMA | NEUTRAL |
| Si | PMMA | PMMA | PMMA | NEUTRAL | PS |
| ITO | PMMA | PMMA | NEUTRAL | PS | PS |
| Cu | PMMA | PMMA | NEUTRAL | PS | PS |
| Mo | PMMA | NEUTRAL | PS | PS | PS |
| Cr | PS | PS | PS | PS | PS |

FIG.12(b)

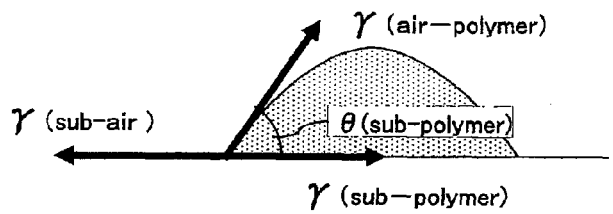

$$\gamma(\text{sub-air}) = \gamma(\text{sub-polymer}) + \gamma(\text{air-polymer}) \cdot \cos\theta(\text{sub-polymer}) \quad (1)$$

$$\gamma(\text{sub-PMMA}) - \gamma(\text{sub-PS})$$
$$= \gamma(\text{air-PS}) \cdot \cos\theta(\text{sub-PS}) - \gamma(\text{air-PMMA}) \cdot \cos\theta(\text{sub-PMMA}) \quad (2)$$

FIG.12(c)

| SURFACE | 150°C | 170°C | 190°C | 200°C | 230°C |
|---|---|---|---|---|---|
| METHACRYLOXY-PROPYL GROUP | PMMA | PMMA | PMMA | PMMA | NEUTRAL |
| PHENETHYL GROUP | NEUTRAL | PS | PS | PS | PS |

MICROSTRUCTURE, PATTERN MEDIUM AND PROCESS FOR PRODUCING SAME

BACKGROUND OF THE INVENTION

The present invention relates to a microstructure composed of a microphase-separated block copolymer, and a process for producing the same. The present invention also relates to a pattern medium carrying a regular pattern corresponding to the microphase-separated structure, and a process for producing the same.

Recently, necessity for arranging fine, regular patterns, several to several hundreds nanometers in size, on substrates has been growing as electronic devices, energy storing devices, sensors and so forth are becoming more compact and functional. Therefore, development of processes which can produce these fine pattern structures at high precision and low cost has been demanded.

These processes for producing the fine patterns are generally based on a top-down procedure, represented by lithography, in which a bulk material is finely inscribed to have a shape. Photolithography used for finely processing semiconductors for production of LSIs is one of the representative examples.

However, the top-down procedure has increasingly become difficult to apply, viewed both from production equipment and process, as demands increase for finer patterns. In particular, production of patterns becoming finer to a size of several tens nanometer, needs a huge equipment investment cost, because it should be aided by electron beams or deep UV ray. Moreover, when fine patterning using a mask becomes difficult, there is no other way but to use a direct drawing procedure should be applied, which cannot avoid problems resulting from greatly decreased process throughputs.

Under these situations, processes based on a phenomenon in which a substance spontaneously forms a structure, the so-called self-assembling phenomenon, have been attracting attention. In particular, a process based on a self-assembling phenomenon of block copolymers, the so-called microphase separation phenomenon, is an excellent process in that it can give fine, regular structures of various shapes having a size of several tens to several hundreds nanometers by a simple coating procedure.

In other words, when dissimilar polymer blocks which constitute a block copolymer are nonmiscible with each other, they undergo microphase separation to self-assemble a microstructure of specific regularity.

The microphase separation of block copolymer produces a microstructure in which spherical or cylindrical microdomains are regularly arranged in a continuous phase, or in which lamellar microdomains are regularly arranged.

When a microphase-separated microstructure is used as an etching mask, it preferably contains cylindrical microdomains regularly arranged in a continuous phase while upstanding on a substrate (or being oriented in the film thickness direction).

Because, a structure with cylindrical microdomains upstanding on a substrate can be more freely adjustable for an aspect ratio (ratio of size of the domain extending in the direction perpendicular to the substrate surface to that extending in the direction parallel to the substrate) than a structure with spherical microdomains regularly arranged on the substrate surface.

When a microphase-separated structure containing spherical microdomains is used as an etching mask, on the other hand, the structure has an aspect ratio of 1 at the largest, which is smaller than that for a cylindrical domain structure upstanding on the substrate and has substantially no adjusting freedom.

The first example of conventional technique for producing microstructures with cylindrical microdomains upstanding on a substrate by utilizing microphase separation phenomenon of block copolymers include one in which a silane coupling film applied beforehand on a Si substrate is irradiated with soft X-ray to form a regular structure by utilizing the difference in wettability (interfacial tension) of two blocks constituting a block copolymer to the radiated part and non-radiated part (for example, see Non-patent Document 1).

The second example of conventional technique utilizes a phenomenon in which wettability (interfacial tension) of two blocks constituting a block copolymer changes depending on thickness of an organic layer formed on a substrate. This technique sets thickness of the organic layer on a substrate in such a way that these blocks have the same interfacial tension (neutral condition), and induces microphase separation on the surface to realize a fine, regular structure (for example, see Non-patent Document 2).

The third example of conventional techniques is one in which a thin film formed on a substrate surface is irradiated with a diffraction pattern of extreme ultraviolet (EUV) ray to modify the affected segment of the thin film (for example, see Non-patent Document 3).

Non-patent Document 1: Langmuir 2000, 16, 4625-4631
Non-patent Document 2: SCIENCE, VOL. 308, 8, Apr., 2005
Non-patent Document 3: NATURE, VOL. 424, 24, Jul., 2003

The regular structure provided by Conventional Technique 1 has a limited fineness of arranged regular pattern, because it depends on focusing extent of soft X-ray.

The regular structure provided by the second example of conventional technique has a limited combination of a polymer material which gives a fine, regular structure and organic layer on a substrate surface, and involves high difficulties coming from necessity for uniformly forming the layer of given thickness on the substrate.

The third example of conventional technique 3 needs a large-scale system for irradiating a substrate with a diffraction pattern of extreme ultraviolet (EUV) ray, and is considered to be very low in mass production capability.

It should be noted that wettability of a block copolymer layer with a substrate surface depends on temperature, with the result that temperature set for forming a regular, microphase-separated structure is an important parameter. The above-described conventional techniques, however, give no consideration to problems associated with the temperature dependence.

SUMMARY OF THE INVENTION

The present invention aims at solving the above problems and provides a microstructure having microdomains oriented in the film thickness direction and arranged in a fine, regular pattern, for which a microphase separation phenomenon occurring at a specific temperature is utilized for a block copolymer; and a process for producing the same. The present invention also provides a pattern medium having a fine, regular pattern arranged on the surface; and a process for producing the same. It also provides a pattern transferring body, e.g., etching mask, which can transfer a fine, regular pattern of a high aspect ratio to an object, and a patterning medium for magnetic recording, which can improve recording density.

The process of the present invention, aiming at solving the above problems, produces a microstructure formed by microphase separation of a polymer layer containing a block copolymer having at least a first block and a second block, wherein a substrate having the block copolymer arranged thereon is thermally treated at a specific temperature for inducing the phase separation, and then cooled at a rate sufficient for keeping the microphase-separated structure intact.

In one embodiment, the present invention comprises 3 steps: a first step for arranging, on a substrate, a polymer layer containing a block copolymer having at least a first block and a second block; a second step for thermally treating the substrate, at a neutral temperature at which the interfacial tension between a first material constituting the first block and the surface of the substrate is substantially equal to the interfacial tension between a second material constituting the second block and the surface of the substrate, to induce microphase separation of polymer layer to produce a structure formed of a continuous phase containing the first block and a microdomain oriented in the thickness direction of the continuous phase and containing the second block; and a third step for cooling the substrate from the neutral temperature to the glass transition temperature of the block copolymer or lower at a rate sufficient for keeping the phase-separated structure produced at the neutral temperature intact.

In the microstructure of the present invention produced by the procedure described above, the first and second blocks of the block copolymer have substantially the same wettability with the substrate kept at the neutral temperature. This induces a self-assembling phenomenon (microphase separation) in the block copolymer, which gives a structure with the microdomains regularly and finely arranged in the continuous phase while upstanding on the substrate at the neutral temperature. The microstructure in which the microphase-separated structure is fixed can be produced by cooling the substrate from the set neutral temperature to the glass transition temperature or lower at a rate sufficient for keeping the phase-separated structure intact.

In another embodiment, the present invention comprises 3 steps: a first step for arranging, on a transfer board, a polymer layer containing a block copolymer having at least a first block and a second block; a second step for thermally treating the transfer board, at a specific temperature, to induce phase separation of the polymer layer to produce a structure formed of a continuous phase containing the first block and a microdomain oriented in the thickness direction of the continuous phase and containing the second block, and a third step for cooling the transfer board from the neutral temperature to the glass transition temperature of the block copolymer or lower at a rate sufficient for keeping the phase-separated structure produced at the specific temperature intact, wherein the transfer board is provided with a patterning member for which the interfacial tension with the second block is lower than the interfacial tension with the first block, on a surface for which the interfacial tension with the first material is lower than the interfacial tension with the second material at the specific temperature.

In the microstructure of the present invention produced by the procedure described above, the second block which constitutes the block copolymers on the transfer board kept at the specific temperature assemble each other on the substrate patterning member with which it is more wettable than with the substrate, whereas the first blocks assemble each other on the substrate surface with which it is more wettable than with the patterning member. At the specific temperature, the microphase separation occurs in the block copolymer to produce a structure with the microdomains arranged in the continuous phase corresponding to the regular pattern on the transfer board, while upstanding on the substrate. The microstructure in which the microphase-separated structure is fixed can be produced by cooling the substrate from the set neutral temperature to the glass transition temperature or lower at a rate sufficient for keeping the phase-separated structure intact.

The pattern medium of the present invention has the protrusion/indentation pattern transferred thereto from the regular pattern of the microphase-separated structure in the microstructure. It may be a master or copy thereof. The transfer board of the present invention is provided with a regular pattern on its surface to produce the microphase-separated structure corresponding to the regular pattern in the microstructure.

The present invention provides a microstructure having microdomains oriented in the film thickness direction and the pattern arranged in a fine, regular pattern by inducing a microphase separation phenomenon in a block copolymer at a specific temperature and then cooling the above structure at a rate sufficient for keeping the formed microphase-separated structure intact; and also provides a process for producing the microstructure. The present invention also provides a pattern medium having the fine, regular pattern arranged on the surface; and process for producing the same.

Other objects, features and advantages of the invention will become apparent from the following description of the embodiments of the invention taken in conjunction with the accompanying drawings.

BRIEF DESCRIPTION OF THE DRAWINGS

FIG. 3(a) is a graph illustrating temperature dependence of interfacial tension of a first and second materials which constitute a block copolymer with a substrate surface, and FIGS. 3(b) to (d) are conceptual drawings illustrating wettability of the first and second materials with the substrate surface at each set temperature;

FIG. 4 illustrates a process for producing the microstructure of First Embodiment of the present invention, wherein FIG. 4(b) illustrates one example of process step of Example, whereas Figs. (a) and (c) illustrate those of comparative examples for comparison;

FIG. 5 illustrates the microstructure of Second Embodiment of the present invention, wherein

FIG. 6 illustrates the microstructure of Third Embodiment of the present invention, wherein

FIG. 8 illustrates the microstructure of Fourth Embodiment of the present invention, wherein

FIG. 9 illustrates the microstructure of Fifth Embodiment of the present invention, wherein

FIGS. 12(a) and (c) summarize polymethyl methacrylate (PMMA) and polystyrene (PS) wettability evaluation results at varying substrate surface temperature, and FIG. 12(b) illustrates a procedure for wettability evaluation.

DESCRIPTION OF REFERENCE NUMERALS

Figure 1A:
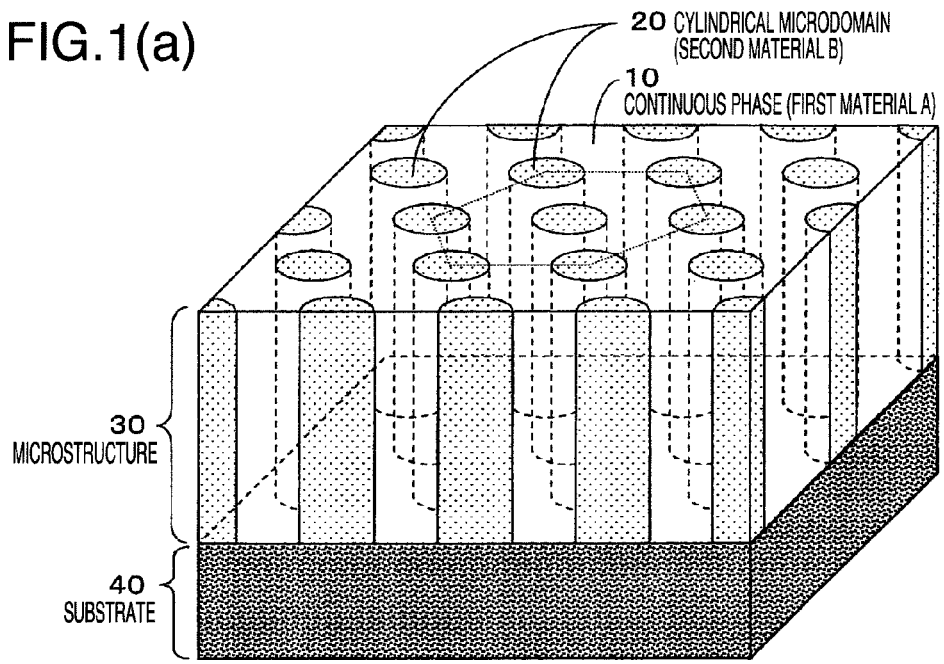
FIG. 1(a) is an oblique view illustrating a microstructure of one embodiment of the present invention.

10 Continuous phase
11 First monomer
12 First block
13 Block copolymer
20 Cylindrical microdomain (microdomain)
21 Second monomer
22 Second block
25, 65 Micropore
31 Block copolymer
32 Polymer film
40 Substrate
41 Peripheral member
42 Patterning member
45 Partition member
50, 50' Transfer board
60, 61, 62 Pattern medium
A First material
B Second material
Tn Neutral temperature
X, Y, Z Surface

DETAILED DESCRIPTION OF THE INVENTION

First Embodiment

First Embodiment of the present invention is described by referring to the drawings.

As illustrated in FIG. 1(a), the microstructure 30 of the embodiment has a microphase-separated structure with the continuous phase 10 and cylindrical microdomains 20, arranged on the substrate 40.

The cylindrical microdomains 20 are distributed in the continuous phase 10, upstanding on the substrate 40 (oriented in the film thickness direction). These cylindrical microdomains 20 are regularly arranged to take a hexagonal closed-packed structure on the horizontal plane of the microstructure 30. It is to be understood that the regular pattern arrangement in the present invention is not limited to such a hexagonal closed-packed structure.

Figure 1B:
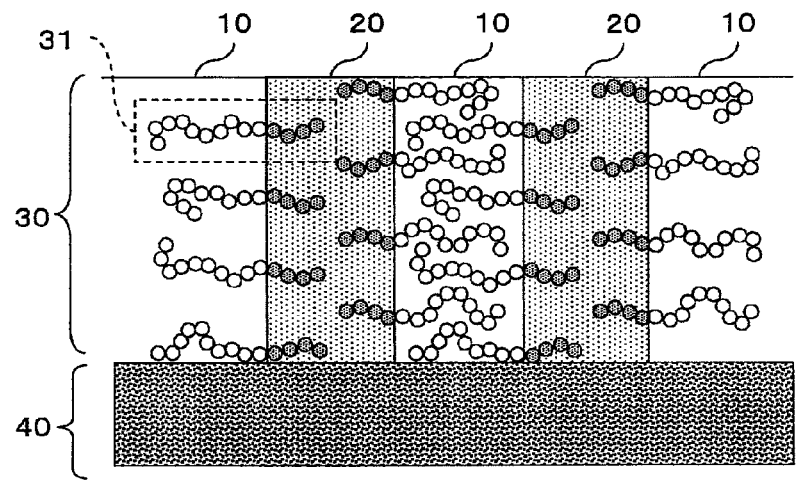
FIG. 1(b) is a longitudinal cross-sectional view of the microstructure.

The microphase-separated structure will be described in more detail by referring to FIG. 1(b), which schematically illustrates a longitudinal cross-sectional view of the magnified microstructure 30.

Figure 1C:
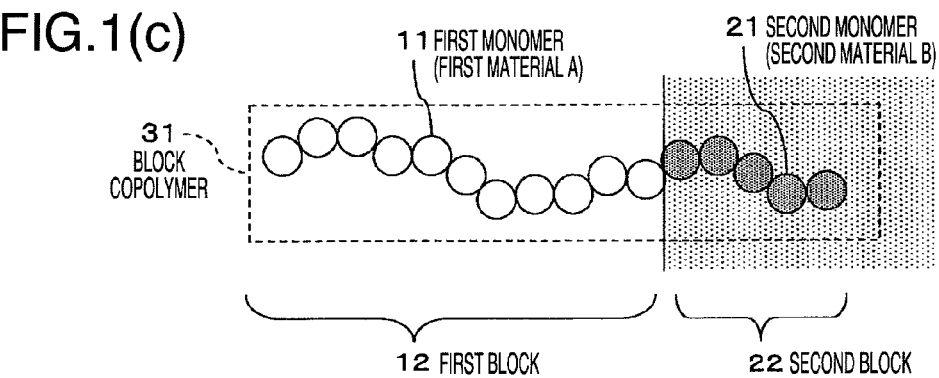
FIG. 1(c) presents a conceptual drawing illustrating a block copolymer as a constitutional element of the microstructure.

The block copolymer 31 as a constitutional unit of the microstructure 30 is composed of the first block 12 and second block 22, as illustrated in FIG. 1(c), the former being a polymer of first monomer 11 (the first material A) and the latter being a polymer of second monomer 21 (the second material B).

It is preferable that the second block 22 in the block copolymer 31 has a lower degree of polymerization than the first block 12, and that the block copolymer 31 has a sharp molecular weight distribution. Controlling degree of polymerization for each segment facilitates formation of a cylindrical arrangement of the joints between the first block 12 and second block 22.

The regions of the continuous phase 10 and cylindrical microdomain 20 are formed, demarcated from each other by the joint between the first block 12 and second block 22 arranged in a manner described above, wherein the continuous phase 10 is mainly composed of a polymer of the first monomer 11 and the cylindrical microdomain 20 is mainly composed of a polymer of the second monomer 21.

The block copolymer 31 may be synthesized by an adequate method, preferably selected from the ones which can produce a sharp molecular weight distribution as much as possible to improve regularity of the microphase-separated structure, one of the adequate processes is living polymerization.

As the block copolymer 31 in this embodiment, an AB type diblock copolymer is illustrated as one example with the first block 12 and the second block 22 bound to each other at the ends as FIG. 1(c). However, the block copolymer for the present invention is not limited to an AB type, and may be a linear or star-shaped block copolymer such as an ABC type triblock copolymer or ABC type composed of 3 or more blocks.

Moreover, FIG. 1 illustrates the cylindrical microdomains 20 oriented in the film thickness direction as an example of microdomains formed in the microstructure 30. However, the microdomain in the present invention is not limited to a cylindrical, upstanding shape. In other words, any microdomain can be used for the present invention, so long as it expresses a characteristic shape at a specific temperature by thermally treating, described later. For example, it may take a cylindrical shape arranged to run in parallel to the microstructure 30 film, lamellar shape, spherical shape or the like.

Similarly, FIG. 1 illustrates the continuous phase uniformly dispersed with the cylindrical microdomains 20 oriented in the film thickness direction in a regular pattern as an example of continuous phase formed in the microstructure 30. However, the continuous phase in the microstructure in the present invention is not limited to the above shape. Any type can be defined as a continuous phase so long as it shares an interface with the microdomains, which can take a varying shape.

Description of the microstructure is continued by referring to FIG. 2.

Figure 2A:
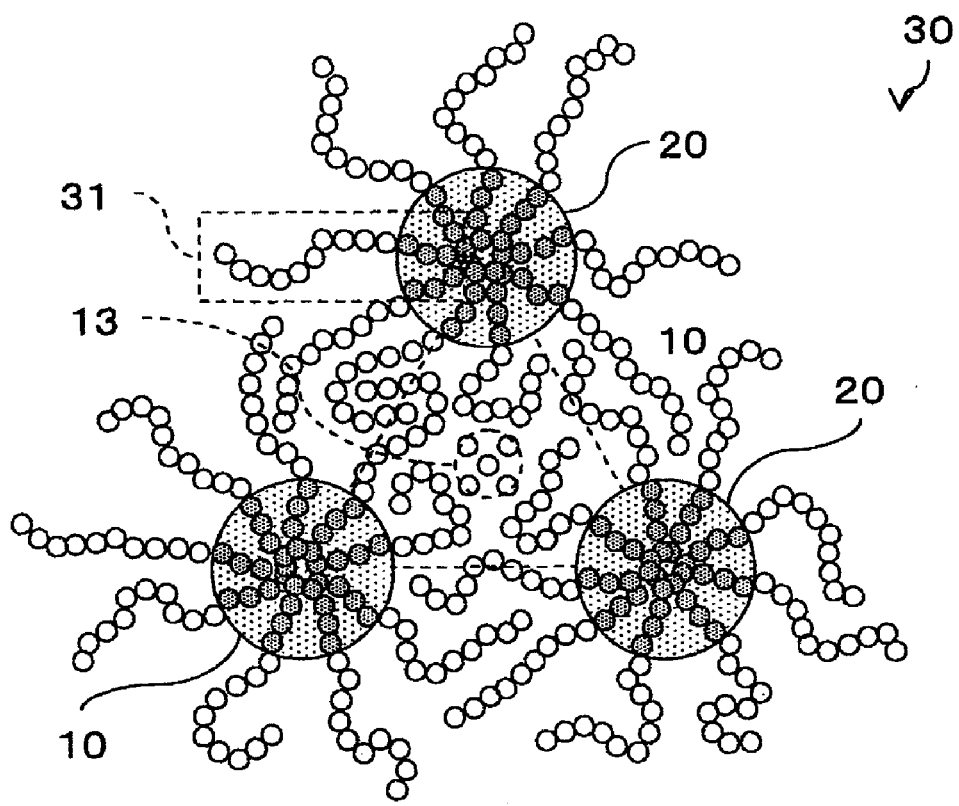
FIG. 2(a) is a top view illustrating a microstructure of another embodiment of the present invention.

The microstructure 30 of First Embodiment may have the polymer 13 miscible with the first block 12, as illustrated in FIG. 2(a).

Figure 2B:
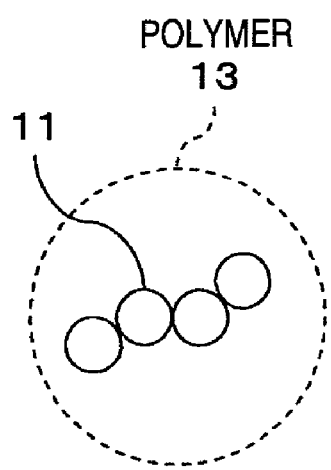
FIG. 2(b) presents a conceptual drawing illustrating a polymer incorporated in the microstructure.

FIG. 2(b) illustrates the polymer 13 formed by polymerizing the first monomer 11, as one example. However, a polymer 13 is not limited to the first monomer 11, as described above, any monomer may be adequately selected, so long as the resulting polymer is miscible with the first block 12, which forms the continuous phase 10 in the block copolymer 31.

It is considered that the polymer 13 be adjusted for degree of polymerization and content be distributed in the gravity center of the unit cylindrical microdomain 20 arrangement, as illustrated in FIG. 2(a), by being incorporated in the block copolymer 31. As a result, the cylindrical microdomains 20 starting to grow from the substrate 40 surface (shown in FIG. 1) are more easily stand upright without lying down. This further improves the effect to orient the cylindrical microdomains 20 to stand upright on the substrate 40 (orientation in the film thickness direction) by the synergy with the effect brought by thermally treating at a neutral temperature Tn, described later.

Incorporation of the polymer 13 is intended not only for standing the cylindrical microdomains 20 upright on the substrate 40, as described above, but also for controlling shape and regular pattern arrangement of the microdomains, whose shape is not limited to cylinder. Moreover, a polymer to be incorporated may be miscible with the second block 22 which constitutes the microdomain for the similar objects.

Next, the first material A and the second material B, which constitute the respective first and second blocks, are described by referring to FIG. 3.

The first material A and the second material B constitute the respective first block 12 and second block 22 (refer to FIG. 1(c)), and make an appearance to explain wettability of these blocks in the block copolymer, molten at its glass transition temperature or higher, with the substrate 40.

FIG. 3(a) is a graph illustrating temperature dependence of interfacial tension $\gamma$ of the first material A and the second material B with the surface X of the substrate 40.

The X-coordinate in FIG. 3(a) represents temperature of the first material A and the second material B, wherein all of the temperatures T1, T2 and T3 shown here are higher than glass transition temperature Tg of the first material A and the second material B, and represents the temperature wherein the first material A and the second material B are in molten state.

The Y-coordinate in FIG. 3(a) represents interfacial tension $\gamma$ at each temperature of the first material A and the second material B with the surface X. Interfacial tension $\gamma$ of the first material A with the substrate 40 is determined by a relative magnitude of cohesive force of the first material A itself in a molten state and intermolecular force between the first material A and substrate 40. In other words, a state of high interfacial tension $\gamma$ of the first material A with the substrate 40 means that the cohesive force relatively prevails over the intermolecular force, so that it acts to minimize the interfacial boundary area (i.e., a state of low wettability). So is vice versa, a state of low interfacial tension $\gamma$ of the first material A with the substrate 40 means that the intermolecular force relatively prevails over the cohesive force, representing a state of high wettability of the first material A with respect to the substrate 40.

For interfacial tension $\gamma$ at a solid/liquid interface, the rate of decreasing liquid cohesive force as temperature increases prevails over the rate of decreasing intermolecular force at a solid/liquid interface, with the result that interfacial tension $\gamma$ draws a downward profile with the increase in temperature, as illustrated in FIG. 3(a). Moreover, temperature dependence of liquid cohesive force and intermolecular force at a solid/liquid interface vary depending on materials for the solid and liquid phases. Therefore, interfacial tension $\gamma$ at the interface between the material A and substrate 40 surface X changes with temperature at a slope different from that with the material B, the temperature profiles being represented by the respective solid and broken lines in FIG. 3(a). As a result, a temperature T2 at which these two temperature profiles intersect with each other possibly exists temperature range where these material A and B are molten, temperature at this point being hereinafter referred to as "neutral temperature Tn".

Two molten materials (the first material A and the second material B) sharing a common neutral temperature Tn have the same interfacial tension $\gamma$, and the same wettability with the substrate 40 at the neutral temperature Tn.

Next, wettability will be described. Consider that substrate 40 is set at temperature T1, at which the first material A has a higher interfacial tension $\gamma$ than the second material B. As illustrated in FIG. 3(b), when the first material A is dropped onto the substrate 40, the resulting droplet has a larger contact angle $\theta$ (A1) with the substrate 40 than the second material B droplet (contact angle $\theta$ (B1)) formed in a similar manner. This state means that the first material A is less wettable with the substrate 40 than the second material B at temperature T1.

When substrate 40 temperature is set at T2 at which the first material A and the second material B have the same interfacial tension $\gamma$ (i.e., at a neutral temperature Tn), the first material A and the second material B droplets formed in a similar manner have the same contact angle with the substrate 40 (contact angle $\theta$ (A2)=contact angle $\theta$ (B2), as illustrated in FIG. 3 (c). This state means that the first material B is as wettable as the second material A with the substrate 40 at temperature T2.

When substrate 40 temperature is set at T3, at which the first material A has a lower interfacial tension $\gamma$ than the second material B, the first material A droplet has a smaller contact angle $\theta$ (A3) with the substrate 40 than the second material B droplet (contact angle $\theta$ (B3)) formed in a similar manner, as illustration in FIG. 3(d). This state means that the first material A is more wettable with the substrate 40 than the second material B at temperature T3. Relative magnitude of interfacial tension $\gamma$ at the interface between the first material A and the second material B has been described by contact angle $\theta$ alone for simplicity. Strictly speaking, however, it should be evaluated by not only contact angle A, but also by the Young's equation, described later (refer to FIG. 12 (b)).

(Process for Producing the Microstructure)

Figure 4:
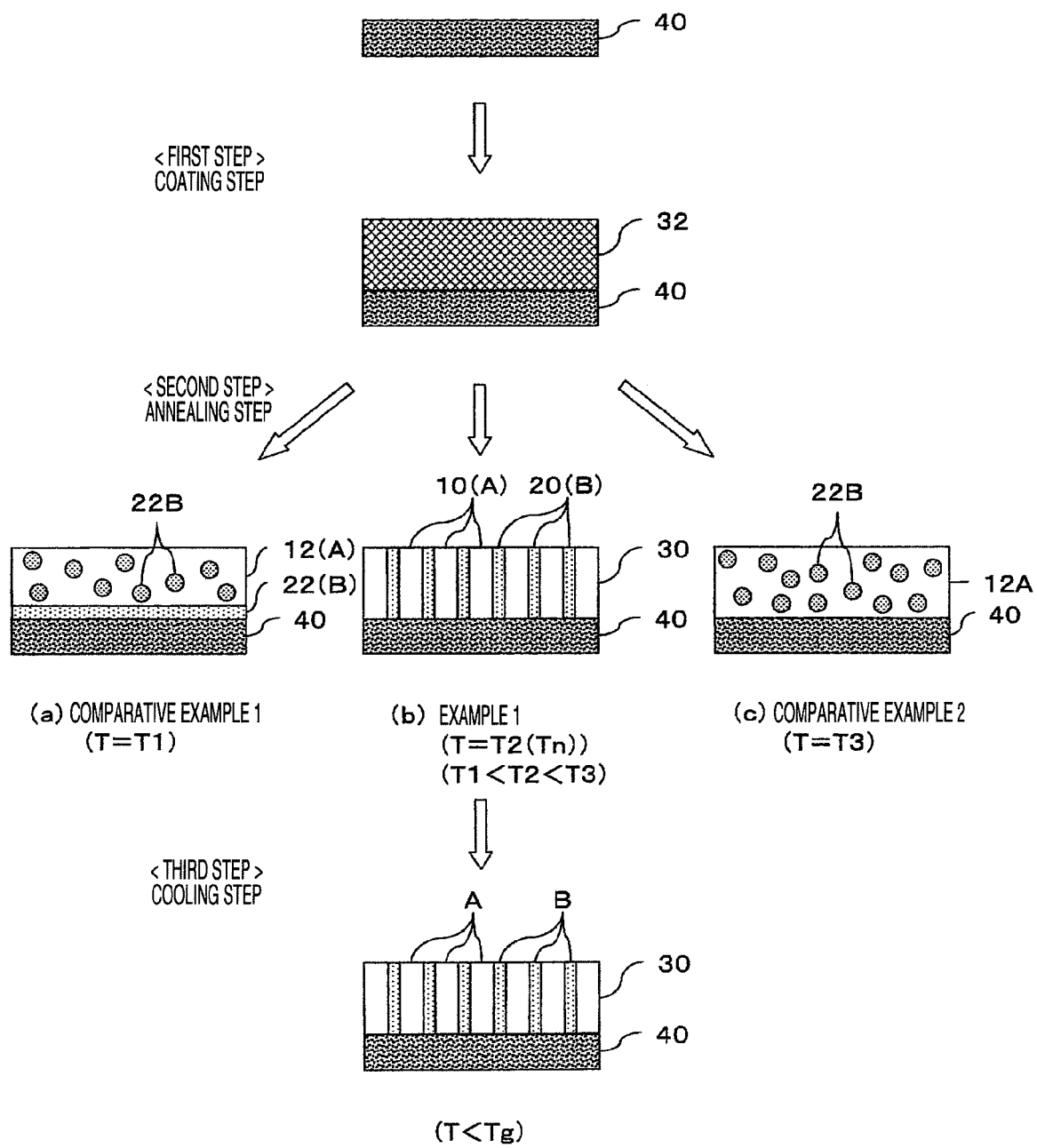

One embodiment of the process for producing the microstructure is described by referring to FIG. 4.

First, a solution is prepared by dissolving the block copolymer 31, or mixture of block copolymer 31 and polymer 13 in a solvent. This solution is applied (arranged) by spin coating, dip coating, solvent casting or the like on the substrate 40 surface to form a polymer film 32 thereon (first step).

It is necessary to adjust mixture concentration and coating conditions (e.g., rotating speed and time when spin coating is adopted, withdrawing rate when dip coating is adopted, and so forth) to secure a given thickness of the polymer film 32, illustrated in FIG. 4.

Next, the solvent is evaporated from the solution to solidify the polymer film 32 on the substrate 40 surface. Thickness of the film can be optionally adjusted for specific purposes. It should be noted, however, that the upstanding cylindrical microdomains 20 tends to have decreased degree of orientation as thickness of the microstructure 30 increases. It is therefore preferable that thickness of the microstructure 30 is set at 10 times or less of cylindrical microdomain 20 diameter.

Next, the polymer film 32 solidified on the substrate 40 is thermally treated at a specific temperature (neutral temperature Tn), at which phase separation of the block copolymer 31 is induced, to produce the microphase-separated structure with the continuous phase 10 and cylindrical microdomains upstanding on the substrate 40, separated from each other as illustrated in FIG. 4(b) (second step).

It is recommended that the thermally treating is carried out under a vacuum, or nitrogen or argon atmosphere to prevent oxidation of the polymer film 32.

Then, by cooling the substrate 40 from the neutral temperature to the block copolymer 31's glass transition temperature or lower at a rate sufficient for keeping the produced microphase-separated structure intact. This produces the microstructure 30 with the solidified microphase-separated structure produced at the neutral temperature Tn (third step).

For reference, when thermally treating temperature is set at T1, at which the second material B has a lower interfacial tension γ with the substrate 40 than the first material A, it is considered that the substrate 40 is coated with the second block 22 layer and the first block 12 layer in this order, wherein the first block 12 layer is dispersed with the cylindrical microdomains composed of the second block 22 lying at a right angle to this paper, as illustrated in FIG. 4 (a). On the other hand, when thermally treating temperature is set at T3, at which the first material A has a lower interfacial tension γ with the substrate 40 than the second material A, it is considered that the continuous phase of the first block 12 comes into contact with the entire face of the substrate 40, in which the cylindrical microdomains composed of the second block 22 are formed to lie at a right angle to this paper, as illustrated in FIG. 4(c).

As discussed above, the microstructure 30 having the microphase-separated structure arranged in a regular pattern, as illustrated in FIG. 4(b), is formed at first time on the substrate 40 when it is thermally treated at a neutral temperature Tn.

The cylindrical microdomains 20 as the constitutional element of the regular pattern can be adequately adjusted for the cross-sectional area and intervals at which they are arranged by changing molecular weight and composition of the block copolymer 31, molecular weight of the polymer 13, and their volumetric fractions.

The "neutral temperature Tn at which the two components have substantially the same interfacial tension" as used in this specification means, in other words, the temperature at which a microphase-separated structure, such as that illustrated in FIG. 4(b), can be produced, and around which a microphase-separated structure of another type, such as that illustrated in FIG. 4(a) or (c), is possibly produced.

The cooling rate at which the microphase-separated structure produced at the neutral temperature Tn is kept intact corresponds to that at which the block copolymer 31 is cooled from the neutral temperature Tn to its glass transition temperature Tg within 5 seconds. This rate is set on the grounds that it takes at least 5 seconds for a block copolymer of similar molecular weight to start to transform a disordered structure into an ordered one. A microphase-separated structure, e.g., the one illustrated in FIG. 4(b), may be partly destroyed when cooled at a lower rate, to partly take a structure, e.g., the one illustrated in FIG. 4(a).

Second Embodiment

Figure 5A:
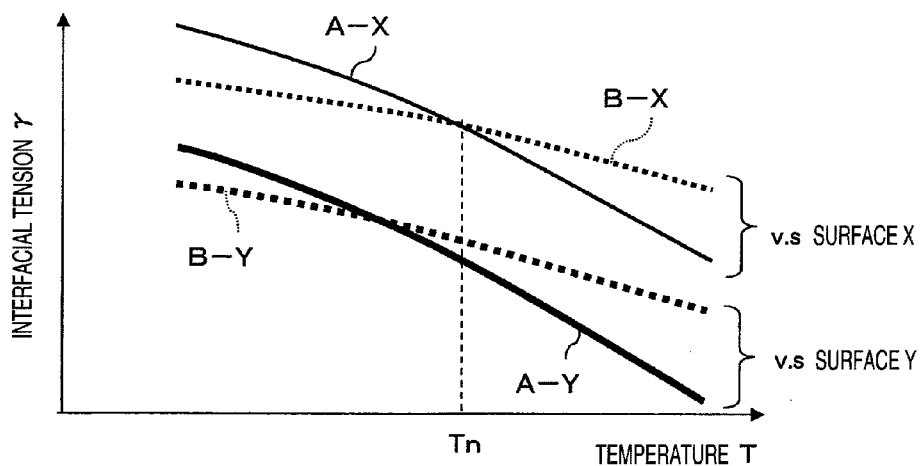
FIG. 5(a) is a graph describing set temperature for a substrate.
Figure 5B:
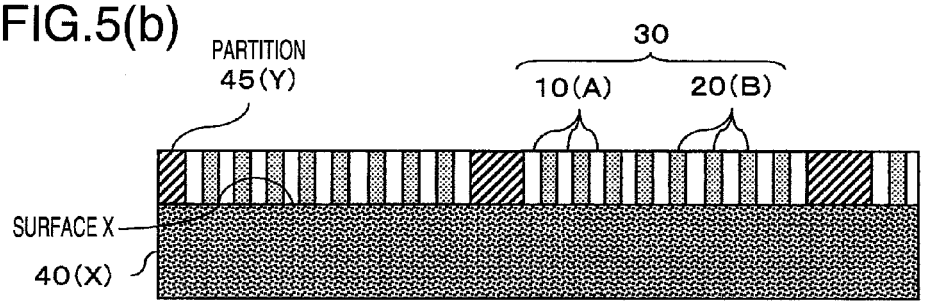
FIG. 5(b) is a longitudinal cross-section of the microstructure.
Figure 5C:
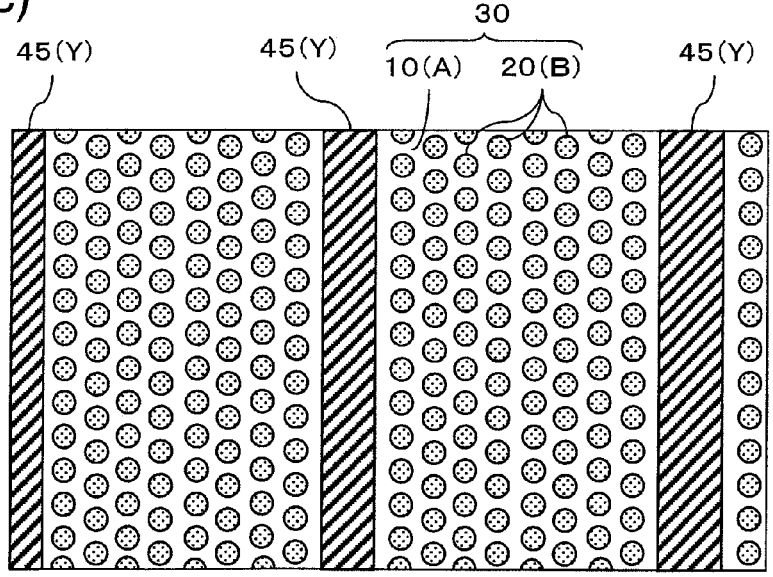
FIG. 5(c) is a top view of the microstructure.

The microstructure of Second Embodiment of the present invention is described by referring to FIG. 5.

The microphase-separated structure 30 of Second Embodiment is divided by partitions 45 serving as the boundaries, formed on the surface of the substrate 40 as illustrated in FIGS. 5(b) and (c).

As illustrated in FIG. 5(a), interfacial tension γ at the interface between the surface Y of the partition 45 and the first material A which constitutes the continuous phase 10 (represented by the temperature profile drawn by the thicker solid line) is set lower than that between the surface Y and the second material B which constitutes the cylindrical microdomain 20 (represented by the temperature profile drawn by the thicker broken line) at the neutral temperature Tn, at which interfacial tension γ at the interface between the surface X of the substrate 40 and the first material A which constitute the continuous phase 10 (represented by the temperature profile drawn by the finer solid line) is substantially the same as that between the surface X and the second material B which constitutes cylindrical microdomain 20 (represented by the temperature profile drawn by the finer broken line).

Moreover, interfacial tension γ at the interface between the surface Y of the partition 45 and the first material A which constitutes the continuous phase 10 may be substantially the same as that between the surface Y and the second material B which constitutes the cylindrical microdomain 20 at the neutral temperature Tn, although not shown in the figure. In this case, the temperature profile drawn by the thicker solid line intersects with that drawn by the thicker broken line at the neutral temperature Tn.

The thermally treating step (refer to FIG. 4) in the process for producing the microstructure 30, when carried out at the neutral temperature Tn having the above relation, gives the microstructure 30 having a structure with the continuous phase 10 divided by the partitions 45 and sharing a border with each partition 45.

Dividing the microstructure 30 into regions defined by the partitions 45 prevents evolution of grain boundaries which disturb regularity of the pattern in which the cylindrical microdomains 20 are arranged in the continuous phase 10.

These partitions 45 can be formed on the substrate 40 by photolithography or the like. Producing the microphase-separated structure in the region surrounded or confined by the partitions 45 can form the microstructure 30, in which evolution of defects, grains, grain boundaries and so forth are controlled, on the substrate 40.

Third Embodiment

Figure 6A:
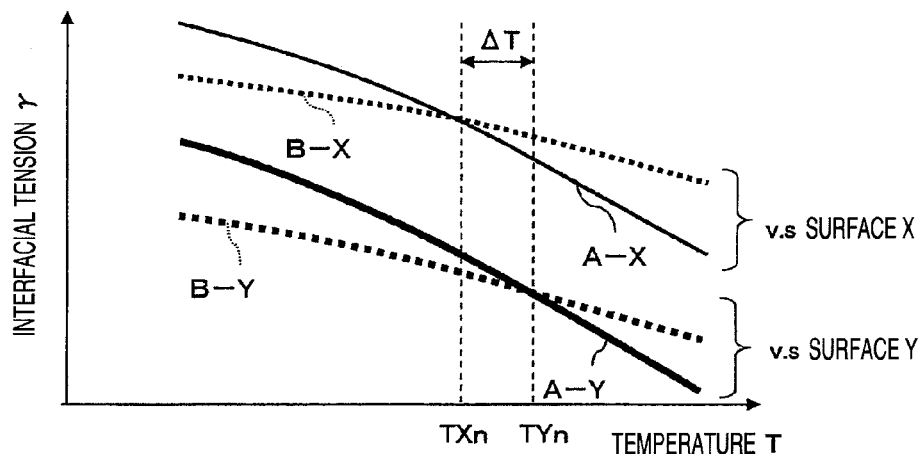
FIG. 6(a) is a graph describing set temperature for a substrate.
Figure 6B:
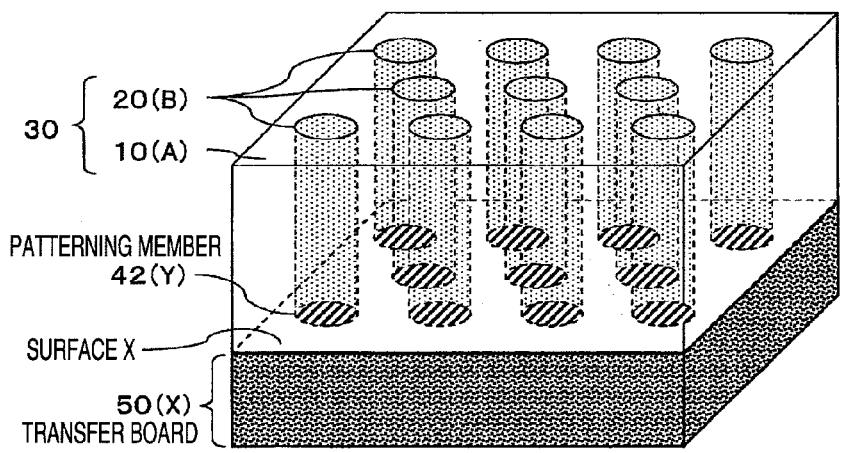
FIG. 6(b) is an oblique view of the microstructure, and FIGS. 6(c1) and (c2) are longitudinal cross-sections of the microstructure.
Figure 6:
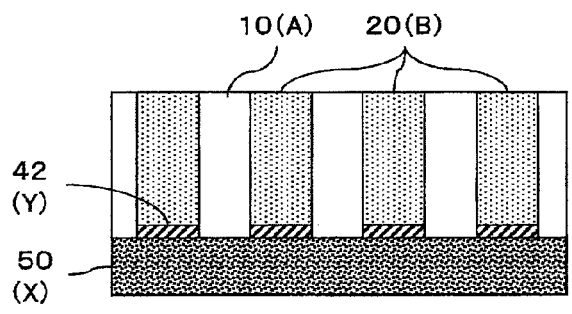
Figure 6:
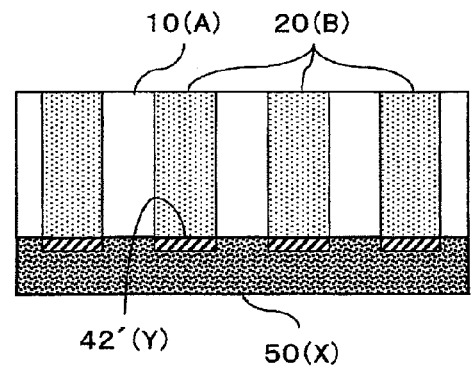

Next, the microstructure of Third Embodiment of the present invention is described by referring to FIG. 6.

The microstructure 30 of Third Embodiment is formed on the transfer board 50, as illustrated in FIG. 6(b). The transfer board 50 is provided, on the surface X, with patterning members 42 at points at which the cylindrical microdomains 20 are arranged.

As illustrated in FIG. 6(a), interfacial tension γ at the interface between the patterning member 42 surface Y and the second material B which constitutes the cylindrical microdomains 20 (represented by the temperature profile drawn by the thicker broken line) is set lower than that between the surface Y and the first material A which constitutes the continuous phase 10 (represented by the temperature profile drawn by the thicker solid line) in a temperature range ΔT, in which interfacial tension γ at the interface between the transfer board 50 surface X and the first material A which constitutes the continuous phase 10 (represented by the temperature profile drawn by the finer solid line) is lower than that between the surface X and the second material B of the second segment 22 which constitutes the cylindrical microdomain 20 (represented by the temperature profile drawn by the finer broken line) (refer to FIG. 1).

The thermally treating step (refer to FIG. 4) in the process for producing the microstructure 30 on the transfer board 50, when carried out at a specific temperature in the temperature range ΔT having the above relation, forms the cylindrical microdomains 20, each arranged one-to-one with the partition member 42. This produces the microstructure 30, in which evolution of defects, grains, grain boundaries and so forth is controlled, on the transfer board 50.

The patterning members 42 or 42' may be formed to have a given thickness on the transfer board 50 surface as shown in FIG. 6(c1), or in indentations provided on the transfer board 50 surface as shown in FIG. 6(c2).

The transfer board 50 illustrated in FIG. 6 (c1) is produced by the following procedure, for example. First, a surface-treated layer such as self-assembled monolayer (SAM) or the like is fixed on a substrate surface by a known method, e.g., that involving silane coupling or thiol coupling reaction. Next, the surface-treated layer fixed on the substrate is coated with a resist film, which is exposed to electron beams at positions corresponding to the patterning members 42 in a known direct drawing method with electron beams. Then, the unexposed resist film portions are removed by a known method, and the exposed portions are decomposed by ashing treatment with an oxygen plasma or the like. Removing the resist film remaining on the surface-treated layer leaves the portions of the surface treatment layer corresponding to the patterning members 42.

It is considered, when the cylindrical microdomains 20 are made of polystyrene (PS), for example, that a monolayer having a functional group highly compatible with PS, e.g., phenethyl group, is fixed on the Si substrate surface. It is also considered, when the cylindrical microdomains 20 are made of polymethyl methacrylate (PMMA), for example, that a monolayer having a functional group highly compatible with PMMA, e.g., methacryloxypropyl group, is fixed on the Si substrate.

Figure 7:
FIGS. 7(a1) to (a6) illustrate a process for producing the microstructure of Third Embodiment, and FIGS. 7(b1) to (b6) illustrate another example.
Figure 7:
Figure 7:
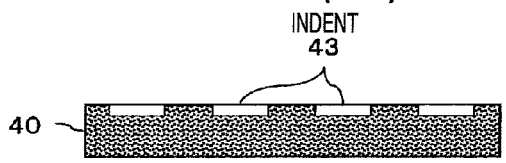
Figure 7:
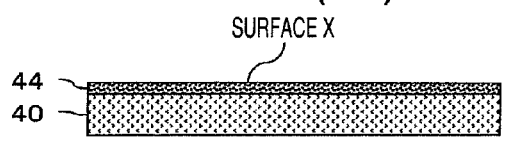
Figure 7:
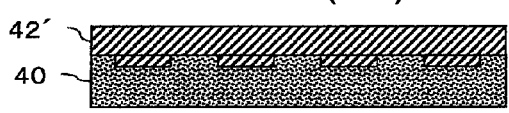
Figure 7:
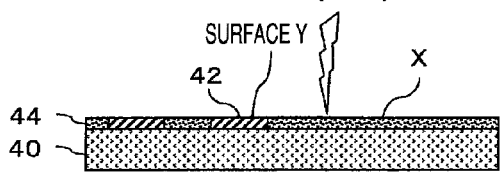
Figure 7:
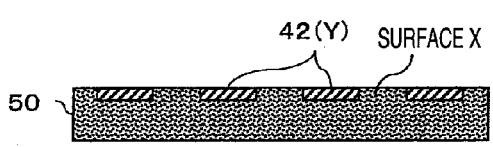
Figure 7:
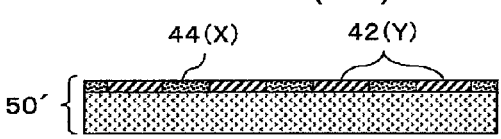
Figure 7:
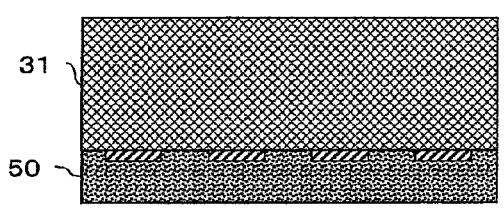
Figure 7:
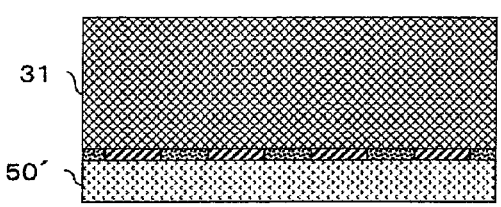
Figure 7:
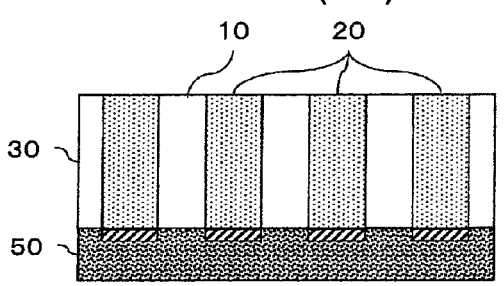
Figure 7:
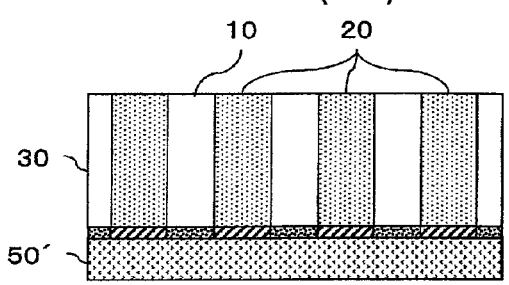

Next, one example of the process for producing the microstructure 30 illustrated in FIG. 6 (c2) is described by referring to FIGS. 7(a1) to (a6). The substrate 40 having a flat surface illustrated in FIG. 7(a1) is irradiated with focused beams to form indentations 43 by scraping the flat surface (a2). Then, the substrate 40 is adhered with a film 42' of the second material B on the surface of the substrate 40 with indentations 43 (a3). The coating film 42' is then ground off to expose the continuous substrate 40 surface X and, at the same time, the surface of the patterning member 42 from the indents 43 (a4) as well. Description of the subsequent steps (a5) and (a6) are omitted, because they correspond to the coating step (first step), thermally treating step (second step) and cooling step (third step) already described by referring to FIG. 4.

Next, another example of the process for producing the microstructure 30 illustrated in FIG. 6 (c2) is described by referring to FIGS. 7(b1) to (b6). First, the substrate 40 having a flat surface illustrated in FIG. 7(b1) is coated with the film 44 having the surface X (b2). Then, the film 44 is irradiated with focused beams to modify the irradiated portion from surface X into surface Y (b3). This produces the regularly arranged patterning members 42 on the transfer board 50' surface (b4). Description of the subsequent steps (b5) and (b6) are omitted, because they correspond to the coating step (first step), thermally treating step (second step) and cooling step (third step) already described by referring to FIG. 4.

Fourth Embodiment

Figure 8A:
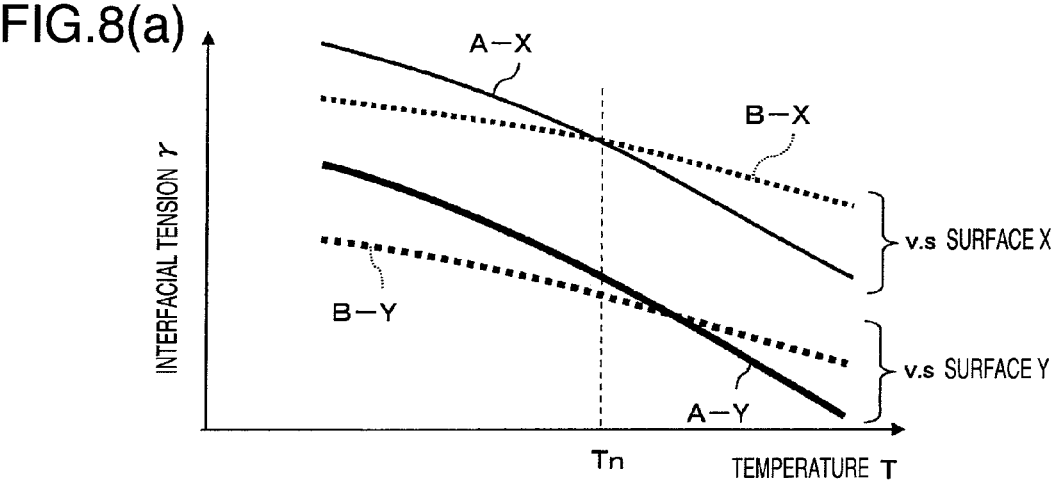
FIG. 8(a) is a graph describing set temperature for a substrate.
Figure 8B:
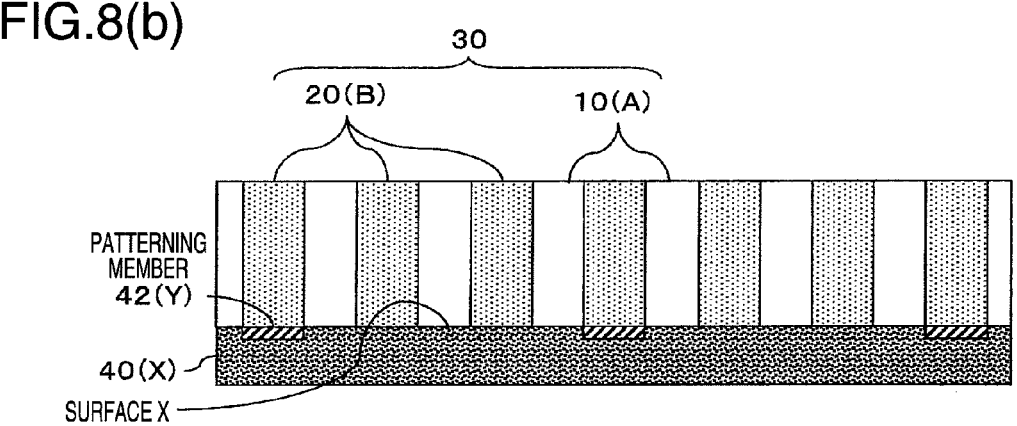
FIG. 8(b) is a longitudinal cross-section of the microstructure.
Figure 8C:
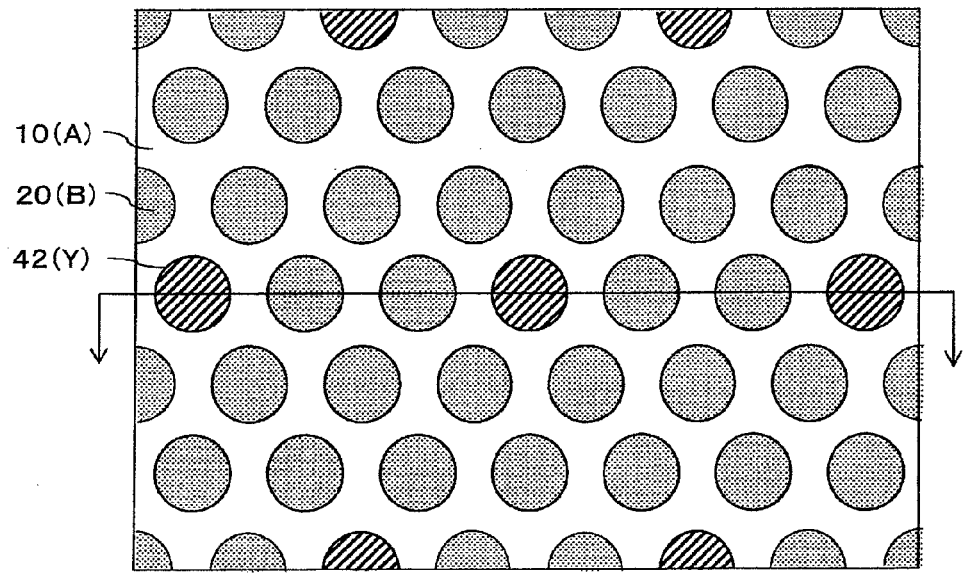
FIG. 8(c) is a top view of the microstructure.

The microstructure of Fourth embodiment of the present invention is described by referring to FIG. 8.

On the substrate 40 surface forming the microstructure 30 of Fourth Embodiment, the patterning members 42 with the exposed surfaces Y are discretely arranged at corresponding points at which the cylindrical microdomains 20 are arranged, as illustrated in FIGS. 8(b) and (c).

In Third Embodiment, the substrate 40 supports the patterning members 42 and cylindrical microdomains 20, each arranged one-to-one with each other. In Fourth Embodiment, on the other hand, the patterning members 42 are thinned, arranged n-to-1 (n is a real number) with the microdomain.

As illustrated in FIG. 8(a), interfacial tension γ at the interface between the surface Y of the pattern member 42 and the second material B which constitutes the cylindrical microdomain 20 (represented by the temperature profile drawn by the thicker broken line) is set lower than that between the surface Y and the first material A which constitutes the continuous phase 10 (represented by the temperature profile drawn by the thicker solid line) at the neutral temperature Tn, at which interfacial tension γ at the interface between the surface X of the substrate 40 and the first material A which constitutes the continuous phase 10 (represented by the temperature profile drawn by the finer solid line) is substantially the same as that between the surface X and the second material B which constitutes the cylindrical microdomain 20 (represented by the temperature profile drawn by the finer broken line).

The thermally treating step (refer to FIG. 4) in the process for producing the microstructure 30, when carried out at the neutral temperature Tn having the above relation, induces a self-assembling phenomenon (so-called microphase separation) in the block copolymer 31 (refer to FIG. 1) originating from the points at which the patterning members 42 are arranged. This prevents evolution of grain boundaries which disturb regularity of the pattern in which the cylindrical microdomains 20 are arranged in the continuous phase 10.

Thus, the patterning members 42, each serving as an origin for growth of the cylindrical microdomain 20, can be arranged in a regular pattern on the entire substrate 40 surface, even when more discretely arranged on the substrate 40. Therefore, the patterning members 42 are allowed to be arranged on the substrate 40 at wider intervals than the cylindrical microdomains 20. Arrangement of patterning members in a regular pattern on the substrate 40 becomes generally more difficult to form as the structure becomes finer. However, the procedure of Fourth Embodiment facilitates formation of the patterning members 42 on the substrate 40 surface, thereby greatly contributing to the reduction of the microstructure 30 production cost.

Fifth Embodiment

Figure 9A:
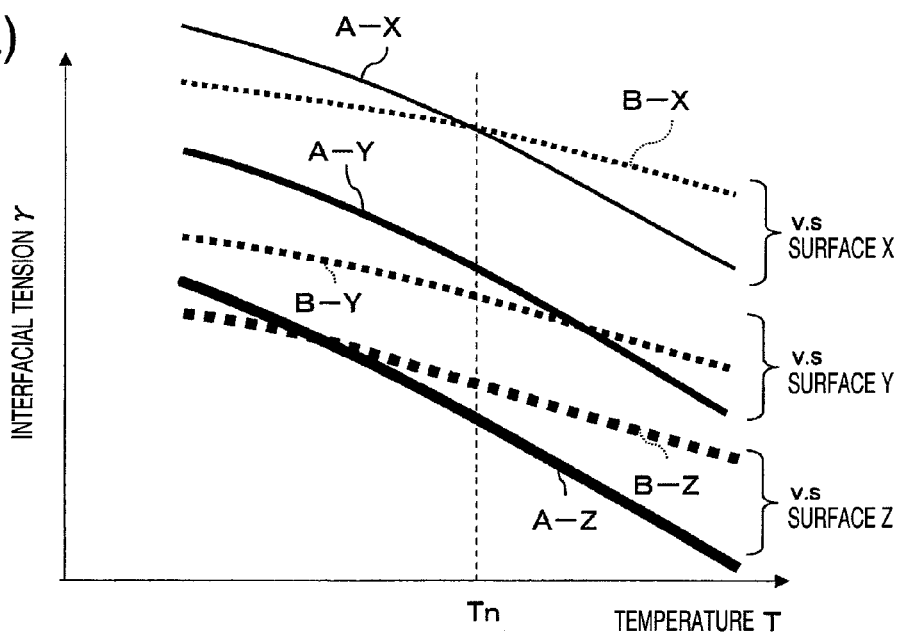
FIG. 9(a) is a graph describing set temperature for a substrate.
Figure 9B:
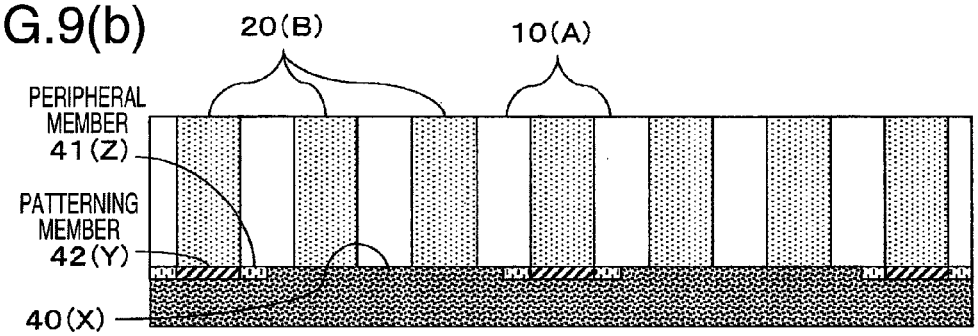
FIG. 9(b) is a longitudinal cross-section of the microstructure.
Figure 9C:
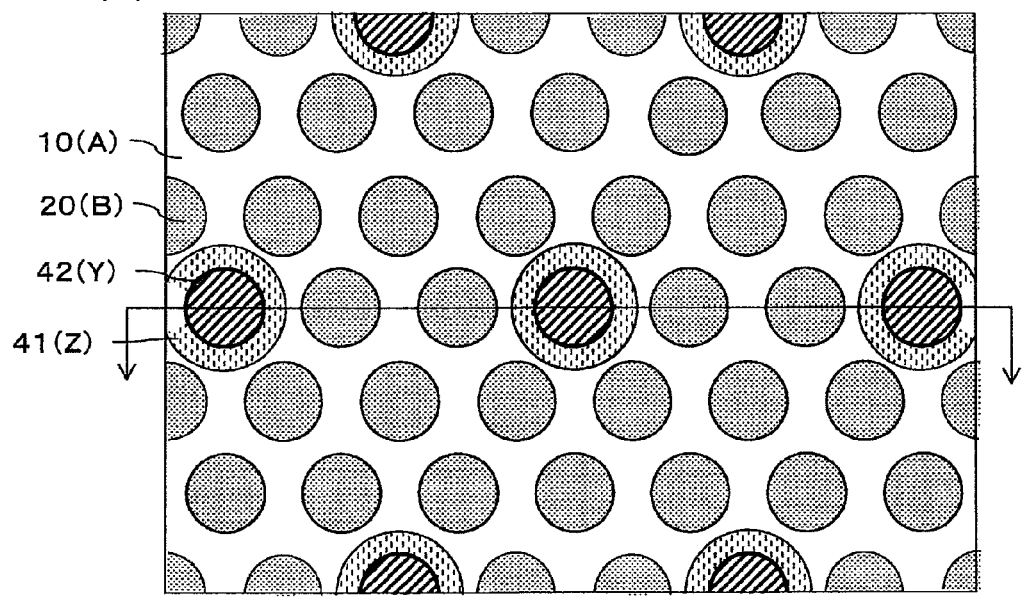
FIG. 9(c) is a top view of the microstructure.

The microstructure of Fifth Embodiment of the present invention is described by referring to FIG. 9.

On the surface X of the substrate 40 on which the microstructure 30 of Fifth Embodiment is formed, the patterning members 42 with the exposed surfaces Y are more discretely arranged at points at which the cylindrical microdomains 20 are arranged, as illustrated in FIGS. 9(b) and (c). Moreover, the peripheral members 41 with the exposed surface Z are provided around the patterning members 42 discretely arranged. Each of the peripheral members 41 shown in FIG. 9 is provided to surround the patterning member 42 periphery. However, arrangement is not limited to the above. For example, it may be provided on part of the patterning member 42 periphery.

As illustrated in FIG. 9(a), interfacial tension γ at the interface between the surface Y of the pattern member 42 and the second material B which constitutes the microdomain 20 (represented by the temperature profile drawn by the intermediately thicker broken line) is set lower than that between the surface Y and the first material A which constitutes the continuous phase 10 (represented by the temperature profile drawn by the intermediately thicker solid line), at the neutral temperature Tn, at which interfacial tension γ at the interface between the surface X of the substrate 40 and the first material A which constitutes the continuous phase 10 (represented by the temperature profile drawn by the finer solid line) is substantially the same as that between the surface X and the second material B which constitutes the cylindrical microdomain 20 (represented by the temperature profile drawn by the finer broken line).

The thermally treating step (refer to FIG. 4) in the process for producing the microstructure 30, when carried out at the neutral temperature Tn having the above relation, induces a self-assembling phenomenon (so-called microphase separation) in the high-molecular-weight block copolymer 31 (refer to FIG. 1) originating from the points at which the patterning members 42 and peripheral members 41 are arranged. This prevents evolution of grain boundaries which disturb regularity of the pattern in which the cylindrical microdomains 20 are arranged in the continuous phase 10.

Thus, more regular patterns than those illustrated in FIG. 8 can be arranged on the entire substrate 40 surface, even when the patterning members 42 as an origin for growth of the cylindrical microdomain 20 and peripheral members 41 as an origin for growth of the continuous phase 10 are discretely arranged on the substrate 40.

Sixth Embodiment

Sixth Embodiment of the process of the present invention for producing the microstructure 30 is described by referring to FIGS. 10(a) to (d), where the microstructure 30 is produced using the transfer board 50.

Figure 10A:
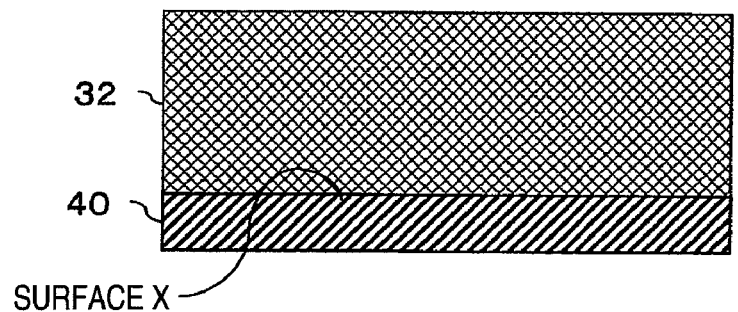
FIGS. 10(a) to (d) illustrate a process for producing the microstructure of Sixth Embodiment of the present invention.
Figure 10B:
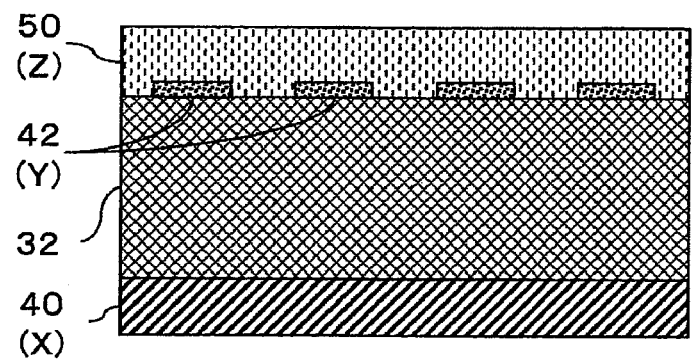

First, the surface X of the substrate 40 is coated with the polymer film 32 composed of block copolymer 31 or mixture of block copolymer 31 and polymer 13 (FIG. 10(a)). Then, the transfer board 50 is arranged on the polymer film 32 (FIG. 10(b)) to contain the patterning members 42 having the surface Y, wherein the first material A which constitutes the continuous phase 10 has a lower interfacial tension γ on the surface Z than the second material B which constitutes the cylindrical microdomains 20, and the second material B has a lower interfacial tension γ on the surface Y than the first material A, both at the neutral temperature Tn, at which the first material A and the second material B have substantially the same interfacial tension γ (refer to FIG. 9(a)).

Figure 10C:
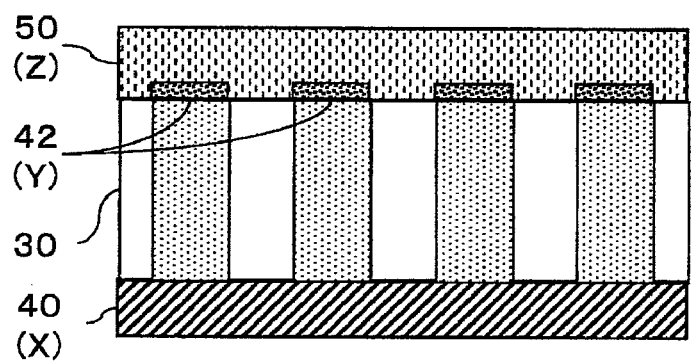
Figure 10D:
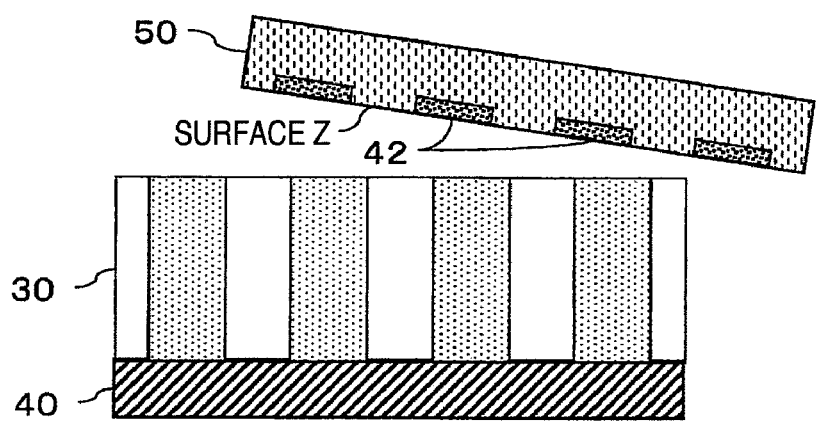

The specimen is then thermally treated at the neutral temperature Tn of the block copolymer 31 to produce the microphase-separated structure, with the continuous phase 10 and cylindrical microdomains 20 upstanding on the substrate 40 being separated from each other (FIG. 10(c)). The microstructure 30 with the produced microphase-separated structure solidified therein can be produced by cooling the substrate 40 from the neutral temperature Tn to the glass transition temperature of the block copolymer 31 Tg or lower and subsequently isolating the transfer board 50 (FIG. 10 (d)).

It is considered that the process for producing the microstructure, illustrated in FIG. 10 (a) to (d), is carried out by a vacuum press (not shown) equipped with a vacuum chamber, and stage mechanism movable horizontally or vertically to a desired position and having a heating mechanism.

Next, the process of one embodiment of the present invention for producing a pattern medium is described by referring to FIGS. 11(a) to (d).

Figure 11A:
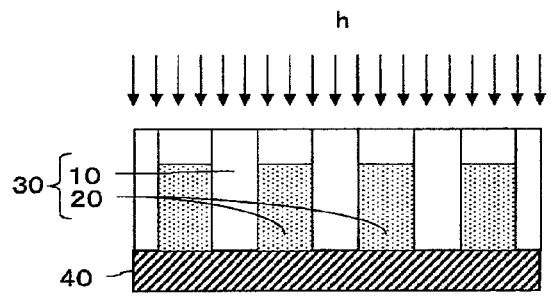
FIGS. 11(a) to (d) illustrate a process for producing a pattern medium according to one embodiment of the present invention.

First, the microstructure 30 illustrated in FIG. 11(a) is irradiated with beams h to selectively remove the cylindrical microdomains 20 from the microphase separated structure. The continuous phase 10 may be selectively removed (not shown).

Either the continuous phase 10 or cylindrical microdomains 20 which constitute the microstructure 30 may be selectively removed by reactive ion etching (RIE) or other etching procedure which utilizes a difference in etching rate between the high-molecular-weight phases.

The pattern medium 60 having a fine, regular pattern arrangement of high indentation/protrusion aspect ratio can be produced by leaving either the continuous phase 10 or cylindrical microdomains 20 as the polymer layer in the microstructure 30 (FIG. 11 (b)).

Figure 11E:
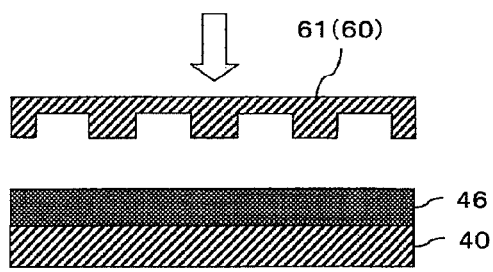
FIGS. 11(e) to (h) illustrate a process for producing pattern medium copies from a pattern medium master.
Figure 11B:
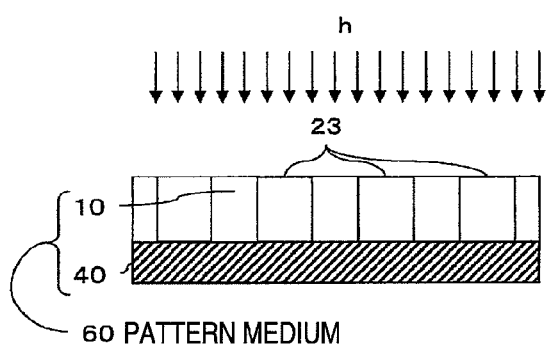
Figure 11F:
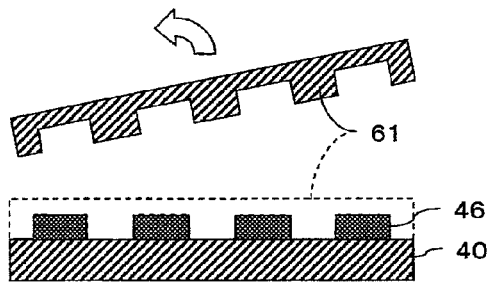
Figure 11C:
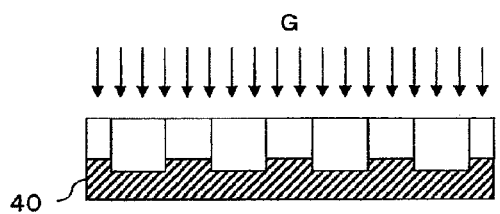
Figure 11G:
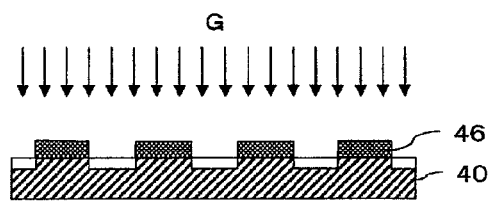

When irradiation of the substrate is continued after the beams h are replaced by a gas capable of efficiently cutting the substrate 40 (e.g., corrosive gas G or the like), an indentation/protrusion regular pattern arrangement can be formed on the substrate 40 surface, where the polymer layer in the continuous phase serves as a mask (FIG. 11(c)). The pattern medium 61 in which the substrate 40 serves as the sole component can be produced by washing the residual polymer layer away from the substrate 40 surface (FIG. 11(d)).

The indentation/protrusion regular pattern can be arranged on the substrate 40 surface by a method, e.g., dry etching with $C_2F_6$ gas as the corrosive gas G, when a thin $SiO_2$ film serves as the surface.

Results of evaluation of the process for producing the pattern medium 61 by dry etching and the fine pattern formed are described below as an example.

The mask used for the dry etching had micropores 23 in the continuous phase 10, these pores having a diameter and height of about 20 nm and 80 nm, arranged in a hexagonal closed-packed structure with a center-to-center distance of about 40 nm (FIG. 11(b)).

Figure 11D:
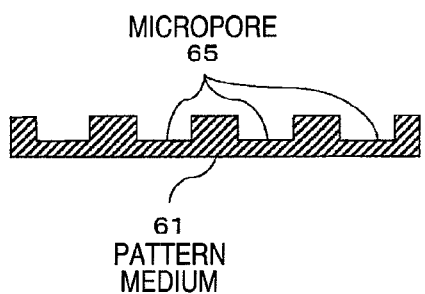
Figure 11H:
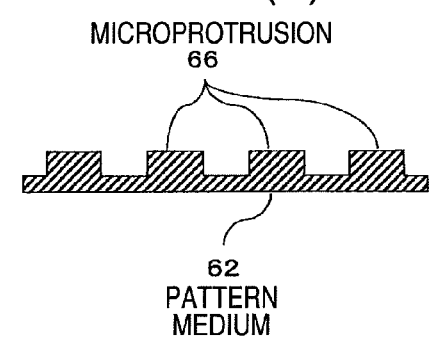

A $SiO_2$ layer is etched under conditions of output power: 150 W, gas pressure: 1 Pa and etching time: 60 seconds, and the thin polymer film remaining on the substrate 40 surface is removed by an oxygen plasma (30 W, 1 Pa and 120 seconds) to produce the pattern medium 61 on which the micropores 65 are formed (FIG. 11(d)).

The pattern medium 61 thus produced has the micropores 65 (diameter: 20 nm), and a hexagonal closed-packed structure forming triangular lattices is arranged substantially regularly with these pores apart from each other by 40 nm as the closest center-to-center distance, as observed by a scanning electron microscope.

The 50 nm deep micropores 65 are uniformly formed on the substrate, as revealed by scanning electron microscopic observation of the substrate cross-section.

Next, the process for producing a pattern medium copy to which a pattern arrangement is transferred from the master is described by referring to FIGS. 11(e) to (h).

First, the plane having an arranged regular pattern of the pattern medium 60 or 61 (master: pattern medium 61 in the figure) is pressed to the surface of the substrate 40 coated with the plastically flowing film 46, as illustrated in FIG. 11(e). The pattern medium 61 is removed from the patterned coating film 46 (enclosed by a broken line shown in FIG. 11(f)) after it is solidified while the pattern medium 61 is held. Then, the exposed surface of the substrate 40 is etched with the corrosive gas G, as illustrated in FIG. 11 (e). Finally, the remaining coating film 46 is removed to produce the pattern medium 62 having the regular pattern of fine protrusions 66 arranged on the surface, which are inverted micropores 65 on the pattern medium 61 as the master.

The pattern medium 60, 61 or 62 may be plated and the plating layer is removed to produce a copy as a pattern medium, although not illustrated.

As discussed above, the present invention provides the microstructure having cylindrical microdomains oriented in the film thickness direction and arranged in a fine, regular pattern, for which a microphase separation phenomenon is utilized for the block copolymer; and the process for producing the same. The present invention can produce the microstructure having a regular pattern by controlling substrate temperature, which simplifies the required production system and hence is excellent in mass productivity. Moreover, the pattern medium produced using the microstructure has a regular pattern which is characterized by its fineness and high aspect ratio.

The present invention is described by referring to a graph showing temperature dependence of interfacial tension γ of the first material A and the second material B which constitute the block copolymer. However, it is not essential for the first material A and the second material B for the present invention to exhibit interfacial tension γ having the temperature dependence described above, so long as they have a given magnitude relation (higher, lower or equivalent) of interfacial tension γ at a set temperature of the substrate 40.

EXAMPLE 1

<Evaluation 1 of Wettability of High-Molecular-Weight Material with Substrate>

Temperature dependence of wettability of polymer material with respect to the substrates having an inorganic or metallic surface was evaluated by the following procedure.

The substrate surface materials evaluated included inorganic ones (silicon (Si), $SiO_2$ and ITO) and metals (tantalum (Ta), copper (Cu), molybdenum (Mo) and chromium (Cr)), as given in the left column in the table in FIG. 12(a).

The polymer materials (the first material A and the second material B) used were polystyrene (PS, molecular weight: 7500) and methyl polymethacrylate (PMMA, molecular weight: 9600).

For the $SiO_2$ surface, a substrate was coated with a $SiO_2$ film by CVD. For the ITO surface, a glass substrate was coated with an ITO film by CVD. For other metallic surfaces, a silicon substrate was coated with a metallic film by sputtering. The film formed by CVD or sputtering was 100 nm thick.

Next, temperature dependence of contact angle θ (refer to FIG. 3) of the polymer material (PS and PMMA) with the varying surfaces described above was determined by the following procedure. A 1.0% solution of PS or PMMA dissolved in toluene was spin-coated (rotation speed: 5000 rpm) on various surfaces of the substrate to prepare the samples of PS and PMMA having a uniform thickness of 80 nm on the substrates.

The sample coated with the thin film was then thermally treated in a vacuum oven at 150, 170, 190, 200 or 230° C. (refer to FIG. 11(a)), which were higher than glass transition temperature of PS or PMMA, for 4 hours. The thin PS or PMMA film of uniform thickness on the substrate was dewetted by the thermally treating into droplets having a diameter of about 2.5 μm, which varied depending on thermally treating temperature (FIGS. 3(b), (c) and (d)).

Next, the coated substrate was withdrawn from the vacuum oven, and immersed in liquid nitrogen for quenching, which solidified the droplet while retaining the shape formed at a varying thermally treating temperature. The PS or PMMA droplet shape was observed by an atomic force microscope to directly determine the contact angle θ.

Wettability of the polymer material of PS or PMMA with a varying surface was determined by Young's equation using contact angle θ of PS or PMMA with the surface of the substrate. Young's equation is given by the formula (1), as shown in FIG. 12(b), where γ (sub-polymer) is interfacial tension of the polymer material with the substrate surface, γ (sub-air) is interfacial tension of air with the substrate surface, γ (air-polymer) is interfacial tension of the polymer material with air, and θ (sub-polymer) is contact angle between the polymer material droplet and substrate surface.

The formula (2) is obtained from the formula (1) in which interfacial tension of polymer material, PS or PMMA, is specifically substituted.

The values of γ (air-PMMA) and γ (air-PS) in the right side of the formula (2) are literature values, and cos θ (sub-PS) and cos θ (sub-PMMA) can be determined by atomic force microscopy. The value of γ (sub-PMMA)–γ (sub-PS) in the left side of the formula (2), i.e., difference between PMMA and PS in interfacial tension with the substrate surface, can be determined.

Smaller interfacial tension γ is more stable. When the value of the left side of the formula (2) is positive, the substrate surface is considered to be PS-selective, because PS is more wettable with the substrate surface than PMMA. So is vice versa, when the value of the left side of the formula (2) is negative, the substrate surface is considered to be PMMA-selective, because PMMA is more wettable with the substrate surface than PS. When the value of the left side is substantially zero, PS and PMMA are considered to be neutral with the substrate surface with respect to wettability.

Knowing that the literature γ (air-PMMA) and γ (air-PS) values are almost the same as the literature values, whether the substrate surface is PS-selective, PMMA-selective or neutral can be roughly determined by the contact angle θ alone (as illustrated in FIG. 3).

FIG. 12(a) gives the results of wettability evaluation, based on the formula (2), for PS and PMMA as the polymer materials with a varying surface at the set temperature levels of 150, 170, 190, 200 or 230° C., where the γ (air-PS) and γ (air-PMMA) values of the formula (2) are taken from Polymer Handbook (1989 edition).

The evaluation results given in FIG. 12(a) are described by taking the ITO surface as an example. The ITO surface is considered to be PMMA-selective at 150 to 170° C., at which PMMA is more wettable therewith than PS. However, it is a neutral surface at around 190° C., and PS-selective surface at 200 to 230° C., at which PS is more wettable than PMMA.

It was found that wettability of PS and PMMA with the ITO surface changed with temperature, and there was a neutral temperature (190° C.) at which the wettability magnitude relation between PS and PMMA was reversed, from the result shown in Table 12 (a). It was also found that the other surfaces other than Cr had a neutral temperature in a range from 150 to 230° C. at which the wettability magnitude relation between PS and PMMA was reversed, as is the case with the ITO surface.

EXAMPLE 2

<Evaluation 2 of Wettability of High-Molecular-Weight Material with Substrate>

Temperature dependence of wettability of polymer material with a substrate having a chemically modified surface as given in FIG. 12(c) was evaluated by the following procedure. More specifically, temperature dependence of wettability of PS and PMMA with the substrate surface chemically modified by treatment with a silane coupling agent was evaluated in a manner similar to that adopted in Example 1.

The treatment with a silane coupling agent was carried out by the following procedure.

The substrate was of silicon, and immersed in a 3/7 mixed solution of concentrated sulfuric acid and hydrogen peroxide water (piranha solution) kept at 90° C. for 10 minutes to thoroughly clean the surface. Then, the substrate washed with pure water and dried in a flow of nitrogen.

The silane coupling agents used were 3-methacryloxypropyltrimethoxy silane and phenethyltrimethoxysilane (both supplied by Aldrich). Each was dissolved in toluene to prepare the 0.1% by mass reaction solution.

Next, the substrate was immersed in the reaction solution for 24 hours, and then in toluene 3 times for rinsing. The obtained substrate was then heated at 200° C. for 10 minutes on a hot plate, to bind methacryloxypropyl or phenethyl group by the following procedure to the silicon substrate surface.

FIG. 12(c) gives the results of wettability evaluation for PS and PMMA with the chemically modified silicon substrate surface to which methacryloxypropyl or phenethyl group was bound. As shown in FIG. 12(c), the surface chemically modified with methacryloxypropyl group was considered to be PMMA-selective at 150 to 200° C., at which PMMA was more wettable therewith than PS, and neutral at 230° C. On the other hand, the surface chemically modified with phenethyl group was PS-selective at 170 to 230° C., and neutral at 150° C.

EXAMPLE 3

<Control of PS-b-PMMA Phase-Separated Structure, Example>

Example of controlling orientation of microphase-separated structure is described taking a film of polystyrene-methyl polymethacrylate diblock copolymer (hereinafter referred to as "PS-b-PMMA"), which was formed on a substrate surface at the neutral temperature at which PS and PMMA had substantially the same interfacial tension with the substrate surface.

The tested PS-b-PMMA (which corresponded to the block copolymer 31 shown in FIG. 1(c)) was composed of the PS segment (number-average molecular weight Mn: 35,500, corresponding to the first segment 12) and PMMA segment (number-average molecular weight Mn: 12,200, corresponding to the second segment 22).

The PS-b-PMMA as a whole had a polydisperse index Mw/Mn of 1.04, which represents molecular weight distribution. It is known that the PS-b-PMMA of this composition, when subjected to micro-phase separation, has a structure with cylindrical microdomains of PMMA dispersed in PS as the continuous phase (refer to FIG. 1(a)).

The PS-b-PMMA was dissolved in toluene to prepare the 5.0% by mass PS-b-PMMA solution. As a substrate, a silicon substrate with a surface coated with a 100 nm thick Mo film by sputtering was used. The PS-b-PMMA solution was spread on the Mo surface of the substrate by spin coating (rotation speed: 3500 rpm) to form the thin film of PS-b-PMMA (thickness: 80 nm) thereon.

The substrate sample with the Mo surface coated with the PS-b-PMMA film was thermally treated under a vacuum in a vacuum drier for 24 hours, to induce micro-phase separation of the PS-b-PMMA and produce an equilibrium structure. Thermally treating temperature was 150, 170 or 200° C. The Mo surface was PMMA-selective at 150° C., neutral at 170° C. and PS-selective at 200° C. (refer to FIG. 12(a)).

The thermally treated substrate sample was withdrawn from of the vacuum oven, and immersed in liquid nitrogen for quenching.

FIG. 13 shows the PS-b-PMMA structure observed by an atomic force microscope (AFM), where the structure was produced by quenching the substrate sample from each set annealing temperature.

The atomic force microscopy (AFM) was carried out by the following procedure with the sample provided with indentations/protrusions derived from the microphase-separated structure on the surface of the thin PS-b-PMMA film. The thin PS-b-PMMA film was irradiated with UV ray for 6 minutes for ashing treatment to remove the PMMA phase to a depth of about 5 nm. This produced the indentations/protrusions derived from the microphase-separated structure on the surface of the thin PS-b-PMMA film.

Figures 13A, 13B, 13C:
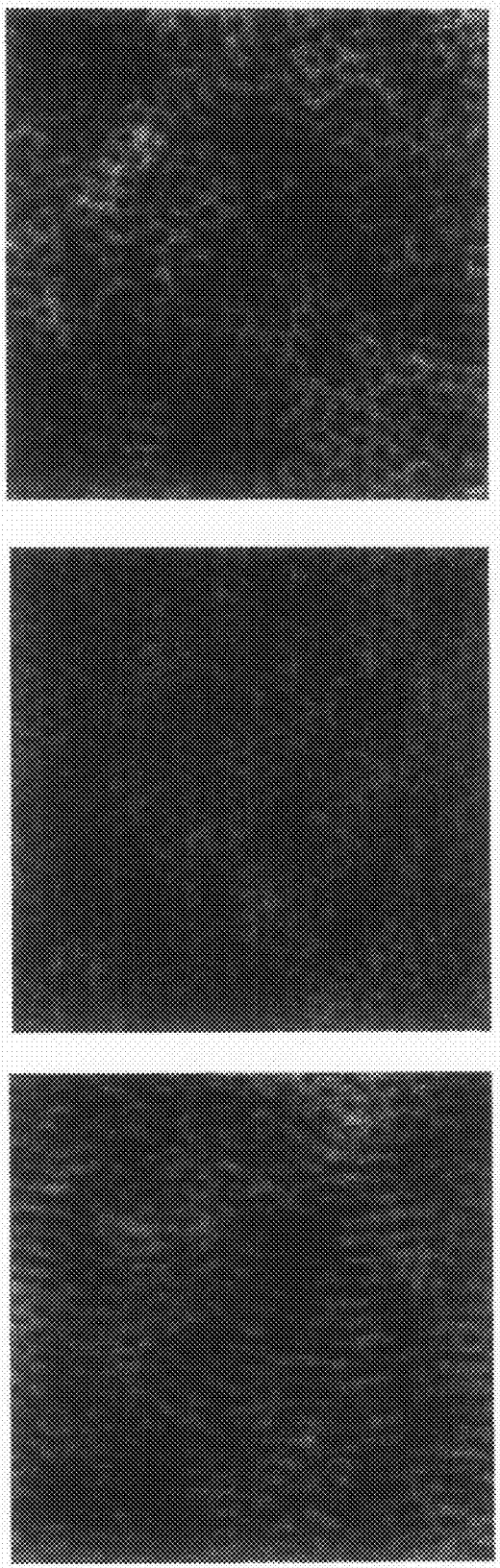
FIG. 13(a) is an AFM image of the microphase-separated microstructure produced at temperature at which the substrate exhibits PMMA-selectivity.
FIG. 13(b) is an AFM image of the microphase-separated microstructure produced at a neutral substrate temperature.
FIG. 13(c) is an AFM image of the microphase-separated microstructure produced at temperature at which the substrate exhibits PS-selectivity.

FIG. 13(a) presents the AFM image of the substrate sample thermally treated at 150° C. at which it was PMMA-selective and then quenched, showing that most of the cylindrical indentations, about 20 nm in diameter, were lying down on the film surface. The indentations were formed when the PMMA phase was etched with UV, indicating that the cylindrical microdomains of PMMA were dispersed in the continuous phase of PS while mostly lying down with the film surface.

FIG. 13(b) presents the AFM image of the substrate sample thermally treated at a neutral temperature of 170° C. and then quenched, showing a structure with circular indentations, about 20 nm in diameter, arranged in a regular pattern on the film surface. These circular indentations were arranged in a substantially hexagonal closed-packed pattern, with the center-to-center distance of about 40 nm. The indentations were formed when the PMMA phase was etched with UV, indicating that the cylindrical microdomains of PMMA were dispersed in the continuous phase of PS while upstanding with the film surface (refer to FIG. 1, as necessary).

FIG. 13(c) presents the AFM image of the substrate sample thermally treated at 190° C., at which it was PS-selective, and then quenched, showing that most of the cylindrical indentations, about 20 nm in diameter, were lying down on the film surface. The indentations were formed when the PMMA phase was etched with UV, indicating that the cylindrical microdomains of PMMA were dispersed in the continuous phase of PS while mostly lying down on the film surface.

A sample prepared by thermally treating at a neutral temperature, corresponding to the one shown in FIG. 13(b), was treated by reactive ion etching with an oxygen plasma under the conditions of gas pressure: 1 Pa, output: 20 W and etching time: 90 seconds, to shave the thin film surface stepwise, although not shown. The surface shape was observed by a scanning electron microscope (SEM).

A plurality of the thin film samples, prepared by the stepwise shaving, produced the similar SEM images, by which it was confirmed that the cylindrical microdomains oriented in the thin polymer film thickness direction were formed, when the sample was thermally treated at a neutral temperature of 170° C. and then quenched.

<Control of PS-b-PMMA Phase-Separated Structure, Comparative Example>

Next, a microphase-separated structure of PS-b-PMMA was verified as Comparative Example. The substrate sample in Comparative Example was prepared in the same manner as in Examples described above, except that the thermally treated sample of the substrate was not quenched but cooled slowly.

The substrate was provided with a Mo, Cu or $SiO_2$ surface. Each of the thermally treated samples was cooled naturally in a vacuum oven for about 2 hours to 90° C., which is lower than glass transition temperature of PS and PMMA, and then withdrawn from the vacuum drier.

It is confirmed that each sample has a structure with the cylindrical microdomains mostly lying down on the substrate, as revealed by atomic force microscopy (AFM) of microphase-separated structure obtained (FIG. 13(a)).

As illustrated in FIG. 12(a), it was considered that the Mo, Cu and $SiO_2$ surfaces were neutral to PS and PMMA at 170° C., 190° C. and 230° C., respectively, and hence possibly supported the cylindrical microdomains upstanding with the substrates.

However, they turned to lie down on the substrate because they were cooled slowly from the neutral thermally treating temperature while taking a time to pass through the temperature range above the glass transition temperature at which the substrate could be PMMA-selective.

It is found, based on the above results, that thermally treating of a substrate at a temperature at which the surface is neutral to PS and PMMA and quenching it from the neutral temperature to glass transition temperature of PS and PMMA or below, whichever is lower, are the essential steps for realizing a structure with the cylindrical microdomains upstanding on the substrate.

The results discussed above are for the PS-b-PMMA structure with the cylindrical microdomains of PMMA dispersed in the continuous phase of PS. However, the similar effects can be produced in the reversed structure, with the cylindrical microdomains of PS dispersed in the continuous phase of PMMA.

The PS-b-PMMA with a lamellar microphase-separated structure can have lamellar microdomains upstanding on a substrate, when thermally treated at a neutral temperature at which the substrate surface is neutral to PS and PMMA and then quenched to glass transition temperature of PS and PMMA or below.

EXAMPLE 4

Example 4 provides an example corresponding to Second Embodiment, described by referring to FIG. 5. More specifically, a grooved structure or the like is formed on a substrate surface by a top-down procedure to produce cylindrical microdomains confined in the groove spaces and having defects, grains, grain boundaries or the like to a very limited extent.

First, a substrate having grooves on the surface is prepared. The grooves having a width of 350 nm and depth of 100 nm (which was height of the partition 45) runs on the surface in parallel to each other at intervals of 50 nm (which is width of the partition 45).

These grooves are formed by the following procedure. The Si substrate having a flat surface is laminated with a 100 nm thick thin $SiO_2$ film by plasma CVD, which is dry-etched by a common photolithography process to a depth of 100 nm to produce grooves. Each groove thus produced has a basal plane of Si and sides of $SiO_2$ (partitions). The substrate thus produced is immersed in a 3/1 mixed solution of concentrated sulfuric acid and hydrogen peroxide water (piranha solution) kept at 60° C. for 10 minutes to thoroughly clean the surface.

The inner surfaces of the grooves thus produced are coated with a polymer layer. The PS and PMMA segments which constitute the PS-b-PMMA in the polymer layer have a number-average molecular weight: Mn of 20,000 and 50,000, respectively. The PS-b-PMMA is further incorporated with PMMA having an Mn of 1,000. The PS-b-PMMA as a whole has a polydisperse index Mw/Mn of 1.09, which represents molecular weight distribution.

Next, the substrate coated with the polymer layer was thermally treated to produce the microphase-separated structure with the cylindrical microdomains of PS were arranged in the continuous phase of PMMA. Thermally treating temperature was 200° C., at which wettability of Si as the substrate surface is neutral to PS and PMMA, for 4 hours. The thermally treated sample was immersed in liquid nitrogen for quenching, and recovered while it retained the structure produced at 200° C.

Then, the cylindrical microdomains of PS were decomposed by RIE with oxygen. It was confirmed by scanning electron microscopy, conducted for observing the substrate surface, that the cylindrical micropores were formed in the grooves to run in the film thickness direction. It was observed that these pores, about 20 nm in diameter, were arranged to take a hexagonal closed-packed structure, with center-to-center distance of about 40 nm. It was also confirmed that the continuous phase of PMMA was in contact with the groove side walls, and that micropores were arranged along the groove side walls to take a hexagonal closed-packed structure corresponding to arrangement of the cylindrical microdomains of PS. Electron microscopy with reduced magnification to observe a 10-micron square area detected no grain boundaries or the like which could disturb micropore arrangement. All of the micropores were arranged in the grooves in the same direction.

It is found, based on the above results, that cylindrical microdomains of PS containing defects, grains, grain boundaries or the like to a very limited extent can be arranged by forming a grooved structure or the like on the substrate surface by a top-down procedure and forming a microphase-separated structure within the grooved structure, i.e., within the confined spaces.

Next, a sample was prepared in another Comparative Example in the same manner as in Example 4, except that the substrate was thermally treated at 150° C. A clear structure was not observed on the obtained substrate surface by scanning electron microscopy, conceivably because the cylindrical microdomains of PS were structured to be randomly dispersed in the grooves without standing upright on the substrate.

Moreover, a sample was prepared in the same manner as the above except that it was cooled slowly after it was thermally treated at 200° C. and tested. The thermally treated sample was cooled naturally in a vacuum oven for about 2 hours to 90° C., which is lower than glass transition temperature of PS and PMMA, whichever is lower, and then withdrawn from the vacuum drier. A clear structure was not observed on the surface by scanning electron microscopy, conceivably because the cylindrical microdomains were structured to be randomly dispersed in the grooves without standing upright on the substrate.

It was found, based on the above results, that thermally treating of a substrate at a temperature at which wettability of the groove basal surface is neutral to PS and PMMA to induce phase separation and quenching it from the neutral temperature to glass transition temperature of PS and PMMA, whichever is lower, to keep the phase-separated structure were the essential steps for realizing a structure with the cylindrical microdomains upstanding on the substrate.

It was found, based on the results of Examples 1 to 4, that wettability magnitude relation (higher, lower or equivalent) of each block which constitutes the PS-b-PMMA depends on temperature, and that a regular microphase-separated structure can be formed by carrying out the thermally treating step at an adequate temperature set in consideration of the relation. Based on these results, the similar effects can be realized in Third to Sixth Embodiments as well, in which the same principle is applied.

The present invention is applicable to industries which use regular microstructures containing defects, grains, grain boundaries and so forth in a wide range of areas to a very limited extent. Some of the applicable areas include microfabrication processes for producing magnetic recording media, semiconductors for manufacturing LSIs, electronic devices, energy storing devices, sensors and so forth.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A process for producing a microstructure comprising:
   a first step for arranging, on a substrate, a polymer layer containing a block copolymer having at least a first segment and a second segment;
   a second step for thermally treating the substrate, at a neutral temperature at which the interfacial tension between a first material constituting the first block and the surface of the substrate is substantially equal to the interfacial tension between a second material constituting the second block and the surface of the substrate, to induce phase separation of the polymer layer to produce a structure formed of a continuous phase containing the first block and a microdomain oriented in the thickness direction of the continuous phase and containing the second block; and
   a third step for cooling the substrate from the neutral temperature to the glass transition temperature of the block copolymer or lower at a rate sufficient for keeping the phase-separated structure produced at the neutral temperature intact.

2. The process for producing a microstructure according to claim 1,
   wherein the substrate has partition members on the surface, by which the microstructure formed thereon is divided, and
   the interfacial tension between the surface of the partition and the first material is lower than or substantially equal to the interfacial tension between the surface of the partition and the second material at the neutral temperature set in consideration of the relations of the first and second materials with the substrate surface.

3. The process for producing a microstructure according to claim 1,
   wherein the substrate has patterning members discretely arranged at points where the cylindrical microdomains are arranged, and
   the interfacial tension between the surface of the patterning member and the second material is lower than the interfacial tension between the surface of the patterning member and the first material at the neutral temperature set in consideration of the relations of the first and second materials with the substrate surface.

4. The process for producing a microstructure according to claim 3,
   wherein the substrate further has peripheral members each provided around the patterning member, and
   the interfacial tension between the surface of the peripheral member and the first material is lower than the interfacial tension between the surface of the peripheral member and the second material at the neutral temperature.

5. The process for producing a microstructure according to claim 1,
   wherein the second step is carried out by arranging transfer boards each provided with a patterning member for which the interfacial tension with the second segment is lower than the interfacial tension with the first segment on a surface for which the interfacial tension with the first material is lower than the interfacial tension with the second material at the neutral temperature.

6. A process for producing a microstructure comprising:
   a first step for arranging, on a transfer board, a polymer layer containing a block copolymer having at least a first block and a second block;
   a second step for thermally treating the transfer board, at a specific temperature, to induce phase separation of the polymer layer to produce a structure formed of a continuous phase containing the first block and a microdomain oriented in the thickness direction of the continuous phase and containing the second block; and
   a third step for cooling the transfer board from the neutral temperature to the glass transition temperature of the block copolymer or lower at a rate sufficient for keeping the phase-separated structure produced at the specific temperature intact,
   wherein the transfer board is provided with a patterning member for which the interfacial tension with the second segment is lower than the interfacial tension with the first segment on a surface for which the interfacial tension with the first material is lower than the interfacial tension with the second material at the specific temperature.

7. The process for producing a microstructure according to claim 1, wherein the polymer layer is further incorporated with a polymer compatible with the first segment.

8. A method for producing a pattern medium, comprising a step for selectively removing one of the continuous phase and the microdomains of a microstructure produced by the process for producing a microstructure according to claim 1.

9. The method for producing a pattern medium according to claim 8, comprising a step for etching the substrate with the remaining continuous phase or microdomains serving as a mask.

* * * * *